United States Patent
Araki

(10) Patent No.: US 11,344,912 B2
(45) Date of Patent: May 31, 2022

(54) METHOD FOR MANUFACTURING LAMINATED PRINTED MATTER, AND LAMINATED PRINTED MATTER

(71) Applicant: FUJIFILM CORPORATION, Tokyo (JP)

(72) Inventor: Kenjiro Araki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/517,692

(22) Filed: Jul. 22, 2019

(65) Prior Publication Data
US 2019/0337308 A1    Nov. 7, 2019

Related U.S. Application Data

(63) Continuation of application No. PCT/JP2017/046785, filed on Dec. 26, 2017.

(30) Foreign Application Priority Data

Jan. 31, 2017  (JP) .............................. JP2017-015858

(51) Int. Cl.
*B05D 1/26* (2006.01)
*B05D 3/06* (2006.01)
(Continued)

(52) U.S. Cl.
CPC ............... *B05D 1/26* (2013.01); *B05D 3/061* (2013.01); *B32B 38/14* (2013.01); *B32B 38/145* (2013.01);
(Continued)

(58) Field of Classification Search
CPC .. B05B 1/00; B05D 1/26; B05D 3/061; B32B 1/00; C09D 11/101; C09D 11/322;
(Continued)

(56) References Cited

U.S. PATENT DOCUMENTS

| | | | |
|---|---|---|---|
| 6,248,804 B1 * | 6/2001 | Lutz .......................... | B41M 1/40 522/14 |
| 2006/0075917 A1 * | 4/2006 | Edwards ............ | B41J 11/00214 101/483 |

(Continued)

FOREIGN PATENT DOCUMENTS

| JP | 2005-126584 A | 5/2005 |
|---|---|---|
| JP | 2005-126585 A | 5/2005 |

(Continued)

OTHER PUBLICATIONS

English translation of WO 2006/129476.*

(Continued)

*Primary Examiner* — Sonya M Sengupta
(74) *Attorney, Agent, or Firm* — Solaris Intellectual Property Group, PLLC

(57) ABSTRACT

A method for manufacturing laminated printed matter includes the steps of ejecting, by an ink jet process, a colorant-containing active-radiation-curable ink composition onto a recording medium; ejecting, by an ink jet process, a colorant-free or white-pigment-containing active-radiation-curable ink composition into a non-image area adjoining an image area formed by the colorant-containing ink composition; curing the ejected colorant-containing ink composition and the ejected colorant-free or white-pigment-containing ink composition by irradiation with active radiation to form an image layer; and laminating a lamination film on a surface on which the image layer has been formed. Laminated printed matter has, in sequence, an image layer and a lamination film. The image layer is composed of an image area and a non-image area. The non-image area is formed of a cured product selected from the group consisting of transparent cured products and white cured products.

(Continued)

The non-image area adjoins a side of the image area in a direction along the plane of the recording medium.

8 Claims, 3 Drawing Sheets

(51) Int. Cl.
    *B41J 2/21*         (2006.01)
    *C09D 11/101*    (2014.01)
    *C09D 11/322*    (2014.01)
    *B41J 11/00*     (2006.01)
    *B32B 38/14*     (2006.01)
    *B32B 38/00*     (2006.01)

(52) U.S. Cl.
    CPC .......... *B41J 2/2114* (2013.01); *B41J 11/0015* (2013.01); *B41J 11/0021* (2021.01); *C09D 11/101* (2013.01); *C09D 11/322* (2013.01)

(58) Field of Classification Search
    CPC ... C09D 11/40; B41M 5/0047; B41M 5/0064; B41M 7/0027; B41M 7/0081; B41J 11/002; B41J 2/2114
    See application file for complete search history.

(56) References Cited

U.S. PATENT DOCUMENTS

2008/0165237 A1*  7/2008  Yamauchi .............. C09D 11/40
                                                347/102
2012/0268537 A1*  10/2012  Takahashi .............. B41J 2/2114
                                                347/102
2014/0232790 A1*  8/2014  Makuta .............. B41J 11/00214
                                                347/47

FOREIGN PATENT DOCUMENTS

| JP | 2007-83611 A | 4/2007 |
|---|---|---|
| JP | 2009-18471 A | 1/2009 |
| JP | 2012-56088 A | 3/2012 |
| JP | 2012-236356 A | 12/2012 |
| JP | 2014-159114 A | 9/2014 |
| JP | 2015-74204 A | 4/2015 |
| JP | 2015-214133 A | 12/2015 |
| WO | 2006/129476 A1 | 12/2006 |

OTHER PUBLICATIONS

International Search Report issued in International Application No. PCT/JP2017/046785 dated Mar. 20, 2018.
Written Opinion of the ISA issued in International Application No. PCT/JP2017/046785 dated Mar. 20, 2018.
English language translation of the following: Office action dated Jul. 23, 2020 from the SIPO in a Chinese patent application No. 201780085045.5 corresponding to the instant patent application.
Extended European Search Report dated Dec. 19, 2019, issued in corresponding EP Patent Application No. 17894915.2.
English language translation of the following: Office action dated May 12, 2020 from the JPO in a Japanese patent application No. 2018-565993 corresponding to the instant patent application.
English language translation of the following: Office action dated Apr. 16, 2021 from the SIPO in a Chinese patent application No. 201780085045.5 corresponding to the instant patent application.

* cited by examiner

METHOD FOR MANUFACTURING LAMINATED PRINTED MATTER, AND LAMINATED PRINTED MATTER

CROSS-REFERENCE TO RELATED APPLICATIONS

This application is a Continuation of International Application No. PCT/JP2017/046785 filed on Dec. 26, 2017, which claims priority to Japanese Patent Application No. 2017-015858 filed on Jan. 31, 2017. The entire contents of these applications are incorporated herein by reference.

BACKGROUND OF THE INVENTION

1. Field of the Invention

The present disclosure relates to methods for manufacturing laminated printed matter and to laminated printed matter.

2. Description of the Related Art

Packaging materials using various resin films are used for the packaging of food, confectionery, household goods, pet food, and other products from the viewpoint of functions such as design, economy, contents protection, and transportation. In addition, many packaging materials are subjected to printing in order to add designs and messages appealing to consumers.

Printing on such packaging materials is performed, for example, by forming an image on a recording medium, applying an adhesive or anchor coat thereto, and subjecting the film to lamination.

Example lamination methods include the following two methods.

One is extrusion lamination, which involves printing an ink composition on various plastic films serving as recording media, optionally applying an anchor coat to the printed surface, and applying and pressing a molten plastic to form a film thereon.

The other is dry lamination, which involves applying an adhesive to a printed surface and laminating a plastic film thereon.

Known printing methods, printing apparatuses, and ink compositions include those described in JP2015-214133A, JP2012-236356A, JP2007-83611A, JP2005-126585A, and JP2012-56088A.

JP2015-214133A describes a printing method for printing on a surface to be printed of a substrate intended for printing by an ink jet process. This method uses a color ink head that is an ink jet head configured to eject ink droplets of a color ink that is a color ultraviolet-curable ink, a clear ink head that is an ink jet head configured to eject ink droplets of a UV clear ink that is a clear ultraviolet-curable ink, and an ultraviolet irradiation device configured for irradiation with ultraviolet radiation. This method includes a color printing step, a non-color-region clear printing step, and an overcoat-layer forming step. The color printing step includes ejecting ink droplets from the color ink head into at least a region of the surface to be printed of the substrate and irradiating the ink with ultraviolet radiation from the ultraviolet irradiation device. The ink droplets are ejected from the color ink head based on a print image that is an image to be printed to print the print image with the color ink. The non-color-region clear printing step includes ejecting ink droplets from the clear ink head and irradiating the ink with ultraviolet radiation from the ultraviolet irradiation device to print the UV clear ink in at least a non-color region that is a region of the surface to be printed of the substrate where no ink droplets have been ejected in the color printing step. The overcoat-layer forming step, which is performed after the non-color-region clear printing step, includes ejecting ink droplets from the clear ink head into a region covering at least the print image printed in the color printing step and irradiating the ink with ultraviolet radiation from the ultraviolet irradiation device to form an overcoat layer that is a layer of the UV clear ink covering the print image.

JP2012-236356A describes an image-forming method for forming an image on a medium using an image-forming apparatus. The image-forming apparatus has (A) a first nozzle group, (B) a second nozzle group, (C) a third nozzle group, and (D) a control unit. The first nozzle group includes nozzles configured to eject an ink for forming a main image and arranged in a predetermined direction. The second nozzle group includes nozzles configured to eject an auxiliary ink and arranged in the predetermined direction. The second nozzle group is arranged side by side with the first nozzle group in a direction crossing the predetermined direction. The third nozzle group includes nozzles configured to eject the auxiliary ink and arranged in the predetermined direction. The third nozzle group is located on one side of the first and second nozzle groups in the predetermined direction. The control unit is configured to repeatedly execute an ejection operation in which the inks are ejected from the nozzles while the nozzle groups and the medium are moved relative to each other in the crossing direction and a transport operation in which the position of the medium relative to the nozzle groups is shifted toward the one side in the predetermined direction. In one ejection operation, the ink is ejected from the first nozzle group into a region where the main image is to be formed in an image-forming region of the medium, and the auxiliary ink is ejected from the second nozzle group into a region where the main image is not to be formed in the image-forming region. In an ejection operation following the one ejection operation, the auxiliary ink is ejected from the third nozzle group over the entire image-forming region.

JP2007-83611A describes an active-radiation-curable ink jet recording apparatus for ejecting, by an ink jet process, an ink that cures when irradiated with active radiation to form an image on a recording medium. The active-radiation-curable ink jet recording apparatus has an image recording unit configured to eject, from an ink jet head configured to eject the ink onto the recording medium to form an image, the ink into both image and non-image areas of the recording medium to form an ink film with uniform thickness on the recording medium, including both image and non-image areas.

JP2005-126585A describes an ink set composed of a plurality of inks containing a colorant, a polymerizable compound, and a photopolymerization initiator. At least one of the inks is a white ink containing a white pigment. The white ink contains a fluorescent brightener and a crown ether compound containing one or more aromatic rings.

JP2012-56088A describes an image recording apparatus including a color-ink ejecting unit configured to eject color ink droplets onto a medium and an overcoat-ink ejecting unit configured to eject overcoat ink droplets onto the medium and the color ink droplets. The maximum size of overcoat ink droplets that can be ejected from the overcoat-ink ejecting unit onto the color ink droplets is larger than the maximum size of color ink droplets that can be ejected from the color-ink ejecting unit onto the medium.

SUMMARY OF THE INVENTION

An object of one embodiment of the present invention is to provide a method for manufacturing laminated printed matter with high suitability for lamination.

Another object of another embodiment of the present invention is to provide laminated printed matter containing few bubbles.

Solutions to achieve the foregoing objects include the following aspects.

[1] A method for manufacturing laminated printed matter includes the steps of ejecting, by an ink jet process, a colorant-containing active-radiation-curable ink composition onto a recording medium; ejecting, by an ink jet process, a colorant-free or white-pigment-containing active-radiation-curable ink composition into a non-image area adjoining an image area formed by the colorant-containing active-radiation-curable ink composition; curing the ejected colorant-containing active-radiation-curable ink composition and the ejected colorant-free or white-pigment-containing active-radiation-curable ink composition by irradiation with active radiation to form an image layer; and laminating a lamination film on a surface on which the image layer has been formed.

[2] In the method for manufacturing laminated printed matter according to [1] above, the absolute value of the difference between the ink film thickness x (μm) in the image area and the ink film thickness y (μm) in a portion, where the colorant-free or white-pigment-containing active-radiation-curable ink composition has been ejected, of the non-image area, |x−y|, is 0 μm to 20 μm.

[3] In the method for manufacturing laminated printed matter according to [1] or [2] above, the colorant-containing active-radiation-curable ink composition and the colorant-free or white-pigment-containing active-radiation-curable ink composition are cured in an atmosphere with an oxygen partial pressure of 0.15 atm or less.

[4] In the method for manufacturing laminated printed matter according to any one of [1] to [3] above, the ink film thickness x in the image area is 6 μm to 35₁A111.

[5] In the method for manufacturing laminated printed matter according to any one of [1] to [4] above, the ink film thickness y in a portion, where the colorant-free or white-pigment-containing active-radiation-curable ink composition has been ejected, of the non-image area is 0.1 μmm or more.

[6] In the method for manufacturing laminated printed matter according to any one of [1] to [5] above, the recording medium is a resin film containing at least one component selected from the group consisting of polyethylene terephthalate, polyethylene, polypropylene, and nylon.

[7] In the method for manufacturing laminated printed matter according to any one of [1] to [6] above, the recording medium has a thickness of 10 μmm to 100 μm.

[8] In the method for manufacturing laminated printed matter according to any one of [1] to [7] above, the colorant-containing active-radiation-curable ink composition and the colorant-free or white-pigment-containing active-radiation-curable ink composition each have a viscosity of 5 mPa·s to 30 mPa·s at 23° C.

[9] In the method for manufacturing laminated printed matter according to any one of [1] to [8] above, the colorant-containing active-radiation-curable ink composition and the colorant-free or white-pigment-containing active-radiation-curable ink composition each contain a di- or higher-functional polymerizable compound in an amount of 50% by mass or more based on the total mass of the ink composition.

[10] In the method for manufacturing laminated printed matter according to any one of [1] to [9] above, the light source of the active radiation is a light-emitting diode.

[11] Laminated printed matter has, in sequence, a recording medium, an image layer, and a lamination film. The image layer is composed of an image area and a non-image area. The non-image area is formed of a cured product selected from the group consisting of transparent cured products and white cured products. The non-image area adjoins a side of the image area in a direction along the plane of the recording medium.

According to one embodiment of the present invention, a method for manufacturing laminated printed matter with high suitability for lamination can be provided.

According to another embodiment of the present invention, laminated printed matter containing few bubbles can be provided.

DESCRIPTION OF THE PREFERRED EMBODIMENTS

Figure 1:
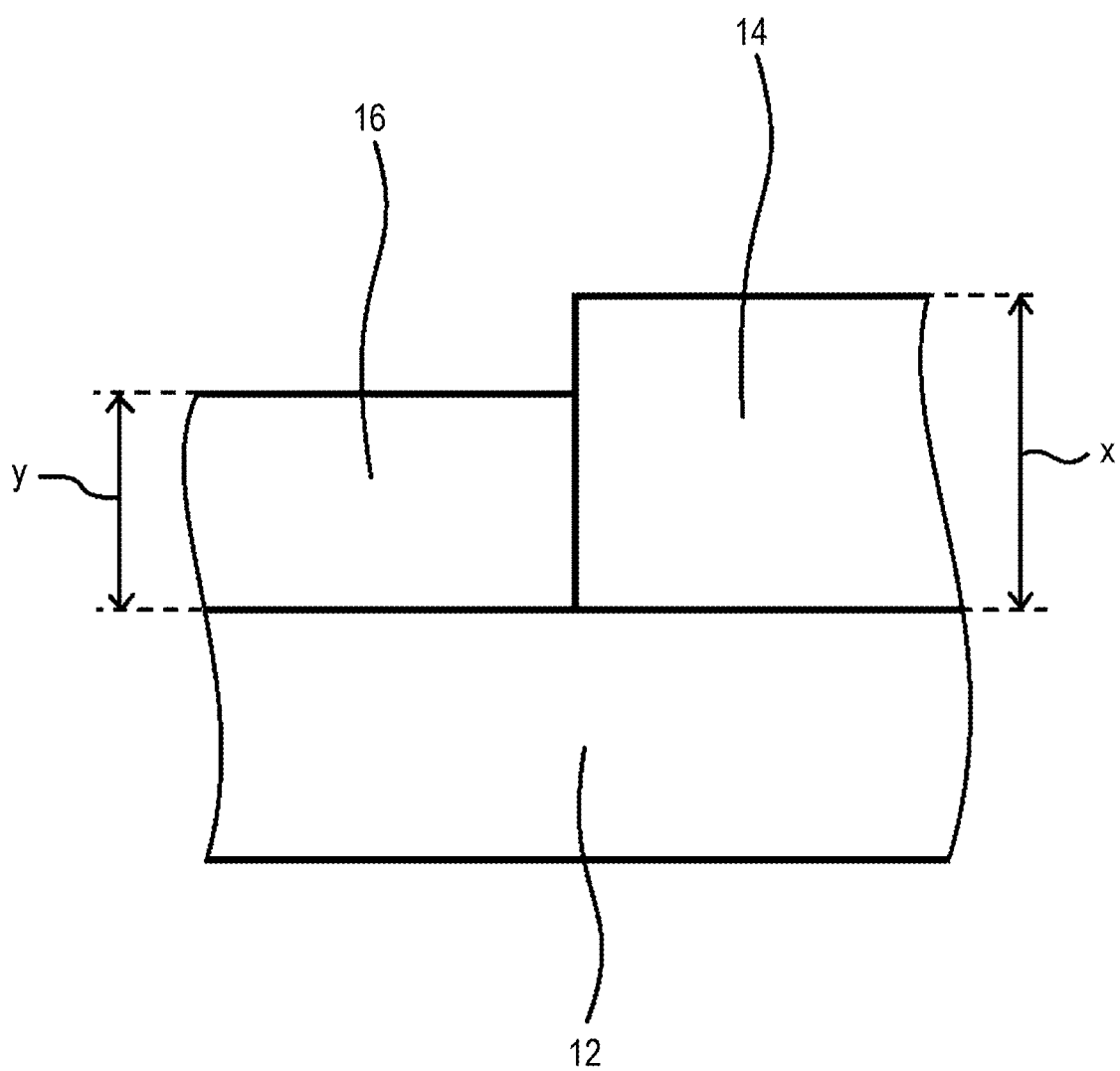
FIG. 1 is a simplified schematic sectional view of an example of image and non-image areas after a curing step of a method for manufacturing laminated printed matter according to the present disclosure.

The present disclosure will hereinafter be described in detail.

As used herein, the phrase "xx to yy" refers to a numerical range including xx and yy.

As used herein, the term "step" includes not only independent steps, but also steps that cannot be clearly distinguished from other steps, provided that the intended purposes of those steps are achieved.

"(Meth)acrylate" and the like are synonymous with "acrylate and/or methacrylate" and the like. The same applies hereinafter.

In the present disclosure, hydrocarbyl groups such as alkyl, aryl, alkylene, and arylene groups may be branched or cyclic unless otherwise specified.

In the present disclosure, "% by mass" is synonymous with "% by weight", and "parts by mass" is synonymous with "parts by weight".

In the present disclosure, combinations of two or more preferred forms are more preferred forms.

In the present disclosure, weight average molecular weight (Mw), unless otherwise specified, is the molecular weight determined by a gel permeation chromatography (GPC) analyzer with TSKgel GMHxL, TSKgel G4000HxL, and TSKgel G2000HxL columns (trade names, all available from Tosoh Corporation). The solvent is tetrahydrofuran (THF). A differential refractometer is used for detection. Polystyrene standards are used for calibration.

The present disclosure will hereinafter be described in detail.

Method for Manufacturing Laminated Printed Matter

A method for manufacturing laminated printed matter according to the present disclosure includes the steps of ejecting, by an ink jet process, a colorant-containing active-radiation-curable ink composition onto a recording medium; ejecting, by an ink jet process, a colorant-free or white-pigment-containing active-radiation-curable ink composition into a non-image area adjoining an image area formed by the colorant-containing active-radiation-curable ink composition; curing the ejected colorant-containing active-radiation-curable ink composition and the ejected colorant-free or white-pigment-containing active-radiation-curable ink composition by irradiation with active radiation to form an image layer; and laminating a lamination film on a surface on which the image layer has been formed.

The colorant-containing active-radiation-curable ink composition (also referred to as "color ink composition") and the colorant-free or white-pigment-containing active-radiation-curable ink composition (also referred to as "non-image-area-forming ink composition") used in the present disclosure will be described after the description of the individual steps. Unless otherwise specified, simply "ink composition" refers to both color ink compositions and non-image-area-forming ink compositions.

In the present disclosure, colorant-free active-radiation-curable ink compositions are also referred to as "clear ink composition".

One problem with known methods for manufacturing laminated printed matter is that bubbles may be trapped, mainly between two image areas in the direction along the plane of the recording medium.

After conducting thorough research, the inventors have found that high suitability for lamination can be achieved if a colorant-free or white-pigment-containing active-radiation-curable ink composition is ejected into a non-image area adjoining an image area by an ink jet process and is cured before a lamination film is laminated thereon.

Although the detailed mechanism is not fully understood, it is believed that, if a cured film of a colorant-free or white-pigment-containing active-radiation-curable ink composition is formed in a non-image area adjoining an image area, the height difference between the image and non-image areas becomes smaller, and accordingly, there is less room for bubbles to be trapped. This will reduce the likelihood of bubbles being trapped during lamination and will therefore provide high suitability for lamination.

In particular, the method for manufacturing laminated printed matter according to the present disclosure provides high suitability for lamination with flexible lamination films such as soft or thin lamination films, which are more likely to trap bubbles.

Furthermore, the ink film formed in the non-image area is also cured, which facilitates lamination, particularly for thin films.

The present disclosure will hereinafter be described in detail.

Image Area Ejection Step and Non-Image Area Ejection Step

The method for manufacturing laminated printed matter according to the present disclosure includes a step of ejecting, by an ink jet process, a colorant-containing active-radiation-curable ink composition onto a recording medium (also referred to as "image area ejection step") and a step of ejecting, by an ink jet process, a colorant-free or white-pigment-containing active-radiation-curable ink composition into a non-image area adjoining an image area formed by the colorant-containing active-radiation-curable ink composition (hereinafter referred to as "non-image area ejection step").

In the image area ejection step, the image area may be formed using either a single color ink composition or two or more color ink compositions. To form a full-color image as the image area, it is preferred to use at least three ink compositions including cyan, magenta, and yellow ink compositions, more preferably at least four ink compositions including cyan, magenta, yellow, and black ink compositions, even more preferably at least five ink compositions including cyan, magenta, yellow, black, and white ink compositions.

In the image area ejection step, the image area may be formed using color ink compositions (including white ink compositions) in combination with clear ink compositions. Specifically, a film of a clear ink composition may be formed on an ink film formed from a color ink composition. It is to be understood that, if a clear ink composition is used, the ink film thickness in the image area, described later, includes the thickness of the ink film of the clear ink composition.

The amount of color ink composition, for example, ejected in the image area ejection step is preferably such that the thickness of the cured ink film falls within such a range as shown below.

The ink film thickness (the thickness of the cured film of the ink composition) x in the image area in the method for manufacturing laminated printed matter according to the present disclosure is preferably 6 μm to 35 μm, more preferably 10 μmm to 30 μm, particularly preferably 20 μmm to 25 μm. This results in a higher color density, reactivity, suitability for lamination, and adhesion strength between a lamination film and an ink film.

The ink film thickness in the present disclosure is measured and calculated by the following method.

The thickness of the image area including the recording medium is measured with a thickness gauge (stainless steel digital caliper (available from BIGMAN)), and the thickness of the recording medium itself is subtracted to determine the thickness of the ink film. The ink film thickness is measured at five points, and the average thereof is calculated and used as the ink film thickness.

In the non-image area ejection step, the non-image area is formed using a colorant-free or white-pigment-containing active-radiation-curable ink composition, that is, a clear ink composition or a white ink composition.

The non-image-area-forming ink composition ejected in the non-image area ejection step and its cured ink film preferably adjoin the image area in the direction along the plane of the recording medium.

If white ink compositions are used in both the image area ejection step and the non-image area ejection step, and a non-image area of a white ink composition is formed so as to adjoin an image area formed by a white ink composition, then the white ink compositions used in the image area ejection step and the non-image area ejection step are preferably different compositions, more preferably compositions that form cured films that look different in color.

In the non-image area ejection step, the colorant-free or white-pigment-containing active-radiation-curable ink composition may be ejected into at least a portion of the non-image area adjoining the image area by an ink jet process. Preferably, the colorant-free or white-pigment-containing active-radiation-curable ink composition is ejected into the entire portion, adjoining the image area, of the non-image area by an ink jet process.

In the non-image area ejection step, it is particularly preferred to eject, by an ink jet process, the colorant-free or white-pigment-containing active-radiation-curable ink composition into the entire non-image area in the region where a lamination film, described later, is to be laminated. This results in a higher suitability for lamination and adhesion strength between a lamination film and an ink film.

The amount of non-image-area-forming ink composition, for example, ejected in the non-image area ejection step is preferably such that the thickness of the cured ink film falls within such a range as shown below.

The ink film thickness (the thickness of the cured film of the ink composition) y in the non-image area in the method for manufacturing laminated printed matter according to the present disclosure is preferably 0.1 μmm or more, more preferably 0.1 μmm to 20 μm, even more preferably 0.5 μmm to 18 μm, particularly preferably 4 μm to 15 μm. This results in a higher reactivity, suitability for lamination, and adhesion strength between a lamination film and an ink film.

In the method for manufacturing laminated printed matter according to the present disclosure, the absolute value of the difference between the ink film thickness x (μm) in the image area and the ink film thickness y (μm) in the portion, where the colorant-free or white-pigment-containing active-radiation-curable ink composition has been ejected, of the non-image area, |x−y|, is preferably 0 μm to 20 μm, more preferably 0 μm to 17 μm, even more preferably 0 μm to 15 μm, particularly preferably 0 μm to 10 μm. This results in a higher color density, reactivity, suitability for lamination, and adhesion strength between a lamination film and an ink film.

To reduce the amount of ink applied, it is preferred that the absolute value |x−y| be more than 0, preferably 1 or more, more preferably 2 or more, even more preferably 5 or more, particularly preferably 10 or more.

In the method for manufacturing laminated printed matter according to the present disclosure, the ratio of the ink film thickness x (μm) in the image area to the ink film thickness y (μm) in the portion, where the colorant-free or white-pigment-containing active-radiation-curable ink composition has been ejected, of the non-image area, x/y, is preferably 0.5 to 40, more preferably 0.8 to 10, particularly preferably 1 to 5. This results in a higher suitability for lamination and adhesion strength between a lamination film and an ink film.

FIG. 1 is a simplified schematic sectional view of an example of image and non-image areas after the curing step, described later, of the method for manufacturing laminated printed matter according to the present disclosure.

In FIG. 1, a recording medium 12 has an image area 14 and a non-image area 16. The non-image area 16 adjoins the image area 14 in the direction along the plane of the recording medium 12. FIG. 1 also shows the ink film thickness x (μm) in the image area 14 and the ink film thickness y (μm) in the portion, where the colorant-free or white-pigment-containing active-radiation-curable ink composition has been ejected, of the non-image area 16.

Figure 2:
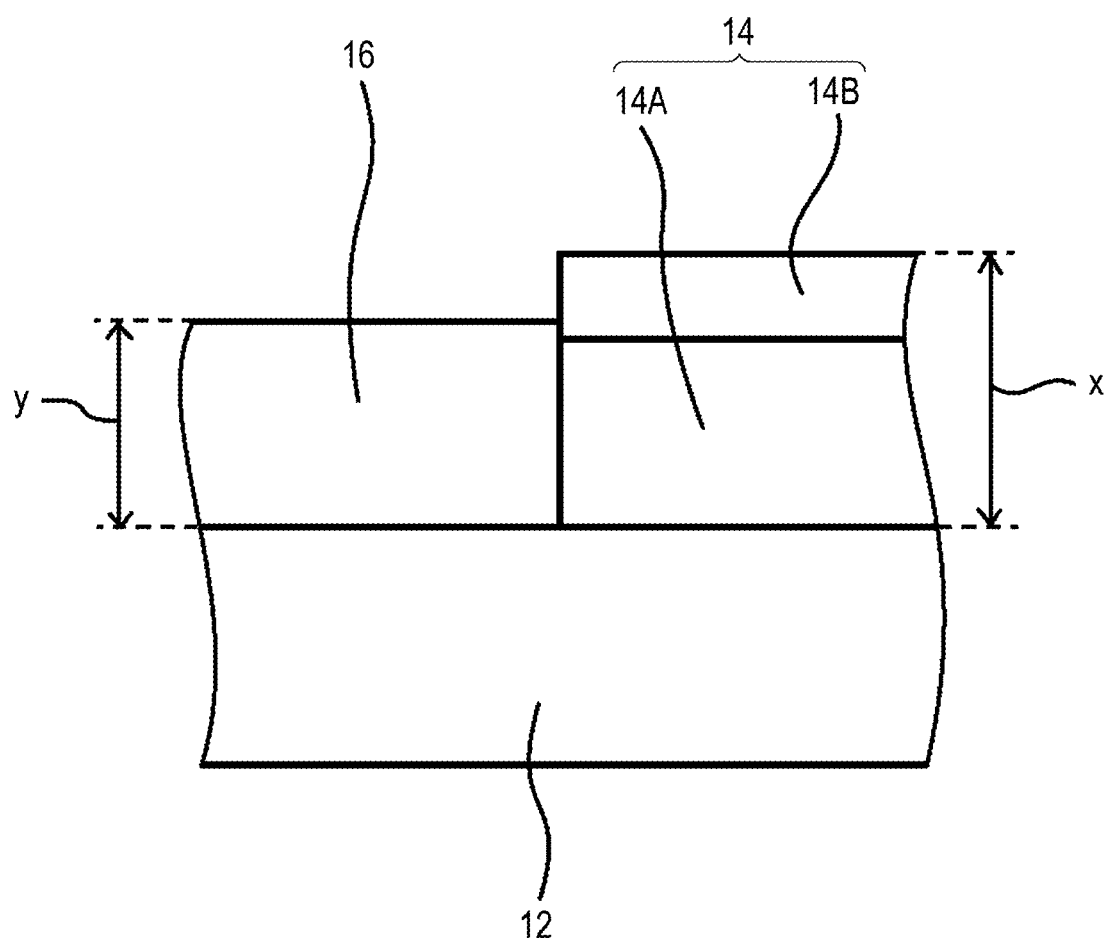
FIG. 2 is a simplified schematic sectional view of another example of image and non-image areas after the curing step of the method for manufacturing laminated printed matter according to the present disclosure.

FIG. 2 is a simplified schematic sectional view of another example of image and non-image areas after the curing step, described later, of the method for manufacturing laminated printed matter according to the present disclosure.

In FIG. 2, a recording medium 12 has image areas 14A and 14B and a non-image area 16. The non-image area 16 adjoins the image areas 14 (14A and 14B) in the direction along the plane of the recording medium 12. The image area 14A is a cured ink film of a color ink composition in the image area, whereas the image area 14B is a cured ink film of a clear ink composition or a white ink composition in the image area. FIG. 2 also shows the ink film thickness x (μm) in the image areas 14A and 14B and the ink film thickness y (μm) in the portion, where the colorant-free or white-pigment-containing active-radiation-curable ink composition has been ejected, of the non-image area 16.

The recording medium used in the present disclosure may be any recording medium, including paper such as normal uncoated paper and coated paper and various non-absorbing resin materials and resin films formed therefrom for use in so-called soft packaging. In particular, resin films are suitable for use.

Examples of various resin films include polyethylene terephthalate (PET) films, biaxially oriented polystyrene (OPS) films, biaxially oriented polypropylene (OPP) films, biaxially oriented nylon (ONy) films, polyvinyl chloride (PVC) films, polyethylene (PE) films, and cellulose triacetate (TAC) films.

Other resins that can be used as recording medium materials include polycarbonates, acrylic resins, acrylonitrile-butadiene-styrene copolymers (ABS), polyacetals, polyvinyl alcohols (PVA), and rubbers. Metals and glasses can also be used as recording media.

In particular, the recording medium is preferably a substrate having an image-forming surface formed of at least one resin selected from the group consisting of polyolefin resins, polyester resins, and polyamide resins, more preferably a substrate having an image-forming surface formed of at least one resin selected from the group consisting of polyethylene terephthalate, polyethylene, polypropylene, and nylon, even more preferably a substrate formed of at least one resin selected from the group consisting of polyethylene terephthalate, polyethylene, polypropylene, and nylon. This results in a higher suitability for lamination.

The thickness of the recording medium used in the present disclosure is preferably, but not limited to, 1 μm to 500 μm, more preferably 2 μm to 200 μm, even more preferably 5 μm to 100 μm, particularly preferably 10 μmm to 90 μm. This results in a higher suitability for lamination.

The ejection of the color ink composition and the non-image-area-forming ink composition in the present disclosure may be performed by any ink jet process, including known ink jet ejection processes.

An example ink jet recording apparatus that can be used in the present disclosure includes an ink supply system, a temperature sensor, and an active radiation source.

The ink supply system is composed of, for example, a stock tank containing an ink composition, a supply pipe, an ink supply tank disposed immediately upstream of an ink jet head, a filter, and a piezoelectric ink jet head. The piezoelectric ink jet head can be driven to eject multisize dots, preferably with volumes of 1 pL to 100 pL, more preferably 8 pL to 30 pL, preferably at a resolution of 320×320 dpi to 4,000×4,000 dpi, more preferably 400×400 dpi to 1,600×1, 600 dpi, even more preferably 720×720 dpi. As used in the present disclosure, dpi (dot per inch) refers to the number of dots per 2.54 cm.

It is preferred that the ink composition be ejected at constant temperature. Accordingly, it is preferred that the ink jet recording apparatus include means for stabilizing the temperature of the ink composition. The region where constant temperature is maintained may include all of the piping systems and members from the ink tank (or, if present, an intermediate tank) to the nozzle ejection surface. That is, thermal insulation and warming can be performed from the ink supply tank to the ink jet head section.

Temperature control may be performed in any manner. For example, it is preferred to provide a plurality of temperature sensors disposed at different piping positions and control heating depending on the flow rate of the ink composition and the ambient temperature. The temperature sensors can be disposed on the ink supply tank and near the nozzles of the ink jet head. It is also preferred to thermally shield or insulate the main body of the apparatus to avoid the influence of outside air temperature on the head unit to be heated. To shorten the printer startup time required for heating or to reduce the loss of thermal energy, it is preferred to thermally insulate the head unit from other units and to reduce the thermal capacity of the entire heating unit.

The temperature of the ink composition during ejection is preferably maintained as constant as possible. Preferably, the temperature of the ink composition during ejection is controlled within ±5° C. from the set temperature, more preferably within ±2° C. from the set temperature, even more preferably within ±1° C. from the set temperature.

For example, if a color image is formed in the image area ejection step, it is preferred to use at least yellow, cyan, magenta, and black ink compositions, more preferably at least white, yellow, cyan, magenta, and black ink compositions.

Light color ink compositions such as light magenta and light cyan ink compositions, special color ink compositions such as orange, green, and violet ink compositions, clear ink compositions, and metallic ink compositions may also be used.

The method for manufacturing laminated printed matter according to the present disclosure may include a step of semi-curing the ejected ink composition when the image area is formed. Exposure means used in the curing step described later is suitable for use as exposure means for semi-curing, with light-emitting diodes (LEDs) being more suitable for use. For semi-curing, reference may be made to, for example, JP2008-248070A and JP2009-221416A.

If two or more ink compositions are ejected, the method for manufacturing laminated printed matter according to the present disclosure preferably includes a step of, after ejecting one ink composition, semi-curing the ejected ink composition before ejecting another ink composition.

If two or more ink compositions are ejected, it is preferred to eject any ink composition onto a semi-cured ink composition.

Although the ink compositions may be ejected in any order in the image area ejection step, the ink compositions are preferably applied to the recording medium in order of increasing lightness. If yellow, cyan, magenta, and black ink compositions are used, the ink compositions are preferably applied to the recording medium in the following order: black→magenta→cyan→yellow. If a white ink composition is used in addition to these ink compositions, the ink compositions are preferably applied to the recording medium in the following order: black→magenta→cyan→yellow→white. Furthermore, the present disclosure is not limited to these ink sets; it is also preferred to use an ink set including a total of at least seven ink compositions including yellow, light cyan, light magenta, cyan, magenta, black, and white ink compositions. In this case, the ink compositions are preferably applied to the recording medium in the following order: black→magenta→cyan→yellow→light magenta→light cyan→white.

Curing Step

The method for manufacturing laminated printed matter according to the present disclosure includes a step of curing the ejected colorant-containing active-radiation-curable ink composition and the ejected colorant-free or white-pigment-containing active-radiation-curable ink composition by irradiation with active radiation to form an image layer (also referred to as "curing step").

The ink compositions cured in the curing step are the ink compositions ejected in the image area ejection step and the non-image area ejection step. The ink compositions may be semi-cured ink compositions.

The irradiation with active radiation in the curing step may be performed one or more times, preferably once. In the curing step, the color ink composition and the non-image-area-forming ink composition may be cured either simultaneously or sequentially, preferably simultaneously.

Next, the irradiation with active radiation will be described.

The ink compositions ejected onto the recording medium are cured by irradiation with active radiation. For example, a polymerization initiator present in the ink compositions is decomposed by irradiation with active radiation to generate polymerization initiation species such as radicals. These initiation species function to induce and promote the polymerization reaction of a polymerizable compound. During this process, if a sensitizer is present in the ink compositions together with the polymerization initiator, the sensitizer in the system is excited by absorbing active radiation and contacts the polymerization initiator to promote the decomposition of the polymerization initiator, which allows for a more sensitive curing reaction.

Examples of active radiation that can be used herein include α-rays, γ-rays, electron beams, X-rays, ultraviolet radiation, visible light, and infrared light. The active radiation preferably has a peak wavelength of, for example, 200 nm to 600 nm, more preferably 300 nm to 450 nm, even more preferably 320 nm to 420 nm, depending on the absorption characteristics of the sensitizer. Particularly preferred active radiation is ultraviolet radiation having a peak wavelength of 340 nm to 400 nm.

The irradiation with active radiation in the curing step is preferably performed at an exposure surface illuminance of 10 mW/cm$^2$ to 4,000 mW/cm$^2$, more preferably 20 mW/cm$^2$ to 2,500 mW/cm$^2$.

Examples of active radiation sources that are typically used include mercury lamps, gas lasers, and solid-state lasers. Mercury lamps and metal halide lamps are widely known as light sources used for the curing of active-radiation-curable ink jet ink compositions. However, mercury-free devices are currently highly desirable from the viewpoint of environmental conservation, and replacement with GaN-based semiconductor ultraviolet light-emitting devices is very useful, both industrially and environmentally. Furthermore, LEDs (UV-LEDs) and LDs (UV-LDs) are promising light sources for photocurable ink jet ink applications because of their small size, long service life, high efficiency, and low cost.

Light-emitting diodes (LEDs) and laser diodes (LDs) can be used as active radiation sources, with LEDs being preferred. In particular, if an ultraviolet radiation source is required, ultraviolet LEDs and ultraviolet LDs can be used. For example, ultraviolet LEDs having main emission spectra at wavelengths between 365 nm and 420 nm are available from Nichia Corporation. If a still shorter wavelength is required, U.S. Pat. No. 6,084,250A discloses LEDs capable of emitting active radiation centered between 300 nm and 370 nm. Other ultraviolet LEDs are also available and can be used for irradiation with radiation in different ultraviolet ranges. Active radiation sources particularly preferred in the present disclosure are UV-LEDs, particularly preferably UV-LEDs having peak wavelengths of 340 nm to 400 nm.

The maximum illuminance of LEDs on recording media is preferably 10 mW/cm$^2$ to 2,000 mW/cm$^2$, more preferably 20 mW/cm$^2$ to 1,000 mW/cm$^2$, particularly preferably 50 mW/cm$^2$ to 800 mW/cm$^2$.

In the curing step, it is preferred to irradiate the ink compositions with such active radiation for 0.01 seconds to 120 seconds, more preferably 0.1 seconds to 90 seconds.

The conditions and basic method for irradiation with active radiation are disclosed in JP1985-132767A (JP-S60-132767A). Specifically, light sources are mounted on both sides of a head unit including an ink-composition ejecting device, and the head unit and the light sources are scanned by a so-called shuttle system. Irradiation with active radiation is performed after a predetermined period of time (preferably 0.01 seconds to 0.5 seconds, more preferably 0.01 seconds to 0.3 seconds, even preferably 0.01 seconds to 0.15 seconds) elapses from the landing of the ink compositions. Thus, the time from the landing of the ink compositions to irradiation is very short, which prevents the ink composition landed on the recording medium from bleeding before curing. In addition, even if the recording medium is porous, the ink composition can be exposed before penetrating into a deep part that is not reached by light, which is preferred because the amount of residual unreacted monomer can be reduced.

Curing may also be completed with another light source that is not driven. WO99/54415A discloses a method for irradiation with an optical fiber and a method for irradiating a recording area with UV light by directing a collimated light onto a mirror surface provided on a side of a head unit. Such curing methods can also be used in the method for manufacturing laminated printed matter according to the present disclosure.

In the curing step, the ink compositions are preferably cured in an atmosphere with an oxygen partial pressure of 0.15 atm or less, more preferably 0.10 atm or less, particularly preferably 0.05 atm or less. This results in a higher reactivity, suitability for lamination, and adhesion strength between a lamination film and an ink film.

In the present disclosure, 1 atm=1 atmosphere=101,325 Pa.

Lamination Step

The method for manufacturing laminated printed matter according to the present disclosure includes a step of laminating a lamination film on the surface on which the image layer has been formed (hereinafter referred to as "lamination step").

Lamination inhibits the leaching of ink components from the printed matter, blocking, and the volatilization and leaching of residual monomer. The resulting laminated printed matter is particularly preferred for use in food packaging.

Examples of lamination films suitable for use include resin films such as polyethylene terephthalate films, polypropylene films, nylon films, polyvinyl chloride films, polyethylene films, and triacetyl cellulose films. These films may be biaxially stretched.

Particularly preferred lamination films are polyethylene films and polypropylene films.

The lamination film preferably has a thickness of 10 μmm to 100 μm, more preferably 10 μmm to 75 μm, particularly preferably 10 μmm to 50 μm. Even for such thin lamination films, the method for manufacturing laminated printed matter according to the present disclosure provides high suitability for lamination.

The thickness of a film or recording medium may be measured by observing a cross section perpendicular to the direction along the plane of the film or recording medium or may be measured with a stainless steel digital caliper (available from BIGMAN).

An example lamination method suitable for the lamination step is dry lamination.

The use of an adhesive is suitable for lamination in the lamination step.

The adhesive may be any adhesive, including known adhesives. The adhesive can be applied by known methods.

In the lamination step, the adhesive may be applied to the image before the lamination film is laminated thereon. Alternatively, the adhesive may be applied to the lamination film in advance before the lamination film is laminated on the image.

Color Ink Composition and Non-Image-Area-Forming Ink Composition

The color ink composition and the non-image-area-forming ink composition (ink compositions) according to the present disclosure preferably each contain a polymerizable compound and a polymerization initiator.

The ink compositions used in the present disclosure are ink compositions that are curable with active radiation, preferably oil-based ink compositions. The ink compositions used in the present disclosure preferably contain as little water and volatile solvent as possible. These components, if present, are preferably present in an amount of 5% by mass or less, more preferably 1% by mass or less, even more preferably 0.5% by mass or less, based on the total mass of the ink composition.

Polymerizable Compound

The ink compositions used in the present disclosure contain a polymerizable compound.

The polymerizable compound may be any compound, including monomers, oligomers, and polymers, that undergoes a polymerization reaction and thereby cures when given some energy. Particularly preferred are various polymerizable monomers known as radically polymerizable monomers, which undergo polymerization reactions in the presence of initiation species generated from polymerization initiators added as desired.

The polymerizable compound is preferably an ethylenically unsaturated compound.

A single polymerizable compound or a mixture of a plurality of polymerizable compounds can be used in order to adjust, for example, the reaction rate, the properties of the cured film, and the properties of the composition. The polymerizable compound may be either a monofunctional compound or a polyfunctional compound. A higher proportion of monofunctional polymerizable compounds tends to result in a higher flexibility of the cured product, whereas a higher proportion of polyfunctional polymerizable compounds tends to result in a higher curability. Thus, the proportions of monofunctional and polyfunctional polymerizable compounds are determined as appropriate depending on the use.

The color ink composition and the non-image-area-forming ink composition used in the present disclosure preferably each contain a di- or higher-functional polymerizable compound in an amount of 50% by mass or more, more preferably 65% by mass or more, particularly preferably 75% by mass or more, based on the total mass of the ink composition. This results in a higher color density, reactivity, suitability for lamination, and adhesion strength between a lamination film and an ink film.

Furthermore, the color ink composition and the non-image-area-forming ink composition used in the present disclosure preferably each contain a di- or higher-functional polymerizable compound in an amount of 60 parts by mass or more, more preferably 80 parts by mass or more, even more preferably 90 parts by mass or more, particularly preferably 95 parts by mass or more, based on 100 parts by mass of all polymerizable compounds present in the ink composition. This results in a higher color density, reactivity, suitability for lamination, and adhesion strength between a lamination film and an ink film.

The color ink composition and the non-image-area-forming ink composition used in the present disclosure preferably each exhibit a volume shrinkage of 10% or more, more preferably 15% to 40%, after curing. This results in a higher color density, reactivity, suitability for lamination, and adhesion strength between a lamination film and an ink film.

The volume shrinkage of the ink compositions in the present disclosure is determined using a CUSTRON EU201C (available from AcroEdge Corporation). Each ink composition is injected into a polytetrafluoroethylene ring for the above device. The ring is set such that a load cell (stress-measuring means) contacts the surface of the injected ink composition. The ink composition is exposed to ultraviolet (UV) light at 100 mW/cm$^2$ in air at 1 atmosphere for 1 second. The amount of shrinkage of the cured product is measured and used to calculate the volume shrinkage of the ink composition.

Preferred polymerizable compounds that can be used include various known radically polymerizable compounds that undergo polymerization reactions in the presence of initiation species generated from radical initiators.

Examples of radically polymerizable compounds include (meth)acrylates, (meth)acrylamides, and aromatic vinyl compounds.

Examples of (meth)acrylates that can be used as radically polymerizable compounds include monofunctional (meth)acrylates, difunctional (meth)acrylates, trifunctional (meth)acrylates, tetrafunctional (meth)acrylates, pentafunctional (meth)acrylates, and hexafunctional (meth)acrylates.

Examples of monofunctional (meth)acrylates include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, and 2-hydroxybutyl (meth)acrylate.

Other examples include 4-hydroxybutyl (meth)acrylate, 3-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethyl silylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethylsuccinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified 2-ethyl hexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, and phenoxyethylene glycol (meth)acrylate.

Examples of difunctional (meth)acrylates include 1,6-hexanediol di(meth)acrylate, 1,10-decanediol di(meth)acrylate, neopentyl glycol di(meth)acrylate, 2,4-dimethyl-1,5-pentanediol di(meth)acrylate, 3-methyl-1,5-pentanediol di(meth)acrylate, butylethylpropanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, neopentyl glycol hydroxypivalate di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, tripropylene glycol di(meth)acrylate, and PO-modified neopentyl glycol di(meth)acrylate.

Examples of trifunctional (meth)acrylates include trimethylolpropane tri(meth)acrylate, trimethylolethane tri(meth)acrylate, alkylene-oxide-modified trimethylolpropane tri(meth)acrylate, pentaerythritol tri(meth)acrylate, dipentaerythritol tri(meth)acrylate, trimethylolpropane tri((meth)acryloyloxypropyl) ether, alkylene-oxide-modified isocyanurate tri(meth)acrylate, dipentaerythritol propionate tri(meth)acrylate, tri((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerol triacrylate.

Examples of tetrafunctional (meth)acrylates include pentaerythritol tetra(meth)acrylate, sorbitol tetra(meth)acrylate, ditrimethylolpropane tetra(meth)acrylate, dipentaerythritol propionate tetra(meth)acrylate, and ethoxylated pentaerythritol tetra(meth)acrylate.

Examples of pentafunctional (meth)acrylates include sorbitol penta(meth)acrylate and dipentaerythritol penta(meth)acrylate.

Examples of hexafunctional (meth)acrylates include dipentaerythritol hexa(meth)acrylate, sorbitol hexa(meth)acrylate, alkylene-oxide-modified phosphazene hexa(meth)acrylate, and ε-caprolactone-modified dipentaerythritol hexa(meth)acrylate.

Examples of (meth)acrylamides that can be used as radically polymerizable compounds include (meth)acryl amide, N-methyl (meth)acryl amide, N-ethyl (meth)acrylamide, N-propyl(meth)acrylamide, N-n-butyl (meth)acryl amide, N-t-butyl (meth)acrylamide, N-butoxymethyl (meth)acrylamide, N-isopropyl(meth)acryl amide, N-methylol(meth) acrylamide, N,N-dimethyl (meth)acrylamide, N,N-diethyl (meth)acryl amide, and (meth)acryloylmorpholine.

Examples of aromatic vinyl compounds that can be used as radically polymerizable compounds include styrene, dimethylstyrene, trimethylstyrene, isopropylstyrene, chloromethylstyrene, methoxystyrene, acetoxystyrene, chlorostyrene, dichlorostyrene, bromostyrene, methylvinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, and 4-t-butoxystyrene.

Further examples of radically polymerizable compounds that can be used in the present disclosure include vinyl esters (e.g., vinyl acetate, vinyl propionate, and vinyl versatate), allyl esters (e.g., allyl acetate), halogen-containing monomers (e.g., vinylidene chloride and vinyl chloride), vinyl ethers (e.g., methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, and triethylene glycol divinyl ether), vinyl cyanides (e.g., (meth)acrylonitrile), olefins (e.g., ethylene and propylene), and N-vinyl lactams (e.g., N-vinylcaprolactam).

More specifically, commercially available compounds such as those described in S. Yamashita, ed. "Crosslinking Agent Handbook" (Taiseisha Ltd., 1981); K. Kato, ed. "UV EB Curing Handbook (Material Section)" (Kobunshi Kankokai, 1985); RadTech Japan, ed. "Application and Market of UVEB Curing Technology", p. 79 (CMC Publishing Co., Ltd., 1989); E. Takiyama "Polyester Resin Handbook" (Nikkan Kogyo Shimbun, Ltd., 1988) as well as radically polymerizable or crosslinkable monomers, oligomers, and polymers known in the art can be used.

These polymerizable compounds can be used alone or in a combination of two or more thereof.

From the viewpoint of curability, depending on the use, the polymerizable compound is preferably present in the ink compositions according to the present disclosure in an amount of 10% by mass to 95% by mass, more preferably 20% by mass to 90% by mass, based on the total mass of the ink composition.

Polymerization Initiator

The ink compositions that can be used in the present disclosure preferably contain a polymerization initiator.

The polymerization initiator is preferably a radical polymerization initiator, more preferably a radical photopolymerization initiator.

Examples of polymerization initiators include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds. These radical polymerization initiators, i.e., the compounds (a) to (m) above, may be used alone or in combination. Specific examples of polymerization initiators include those described in paragraphs 0090 to 0116 of JP2009-185186A.

These polymerization initiators may be used alone or in a combination of two or more thereof in the present disclosure.

Preferred polymerization initiators include acylphosphine compounds, α-hydroxy ketone compounds, and/or α-amino ketone compounds. In particular, acylphosphine compounds and/or α-amino ketone compounds are more preferred, with acylphosphine compounds being even more preferred.

Examples of suitable acylphosphine compounds include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, bis(2,6-dimethoxybenzoyl)-2,4,4-trimethylpentylphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,4,6-trimethylbenzoyldiphenylphosphine oxide (LUCIRIN TPO, available from BASF), 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Preferred of these acylphosphine oxide compounds are bis(2,4,6-trimethylbenzoyl)phenylphosphine oxide (IRGACURE 819, available from BASF) and bis(2,6-dimethoxybenzoyl)-2,4,4-trimethylpentylphenylphosphine oxide, particularly preferably bis(2,4,6-trimethylbenzoyl)phenylphosphine oxide.

Another example of an acylphosphine oxide compound is IRGACURE TPO available from BASF.

From the viewpoint of curability, aromatic ketones are preferred as polymerization initiators.

Preferred aromatic ketones include α-hydroxy ketone compounds and/or α-amino ketone compounds.

Examples of α-hydroxy ketone compounds that can be used include known compounds such as 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone. Particularly preferred are 1-hydroxycyclohexyl phenyl ketone compounds. In the present disclosure, 1-hydroxycyclohexyl phenyl ketone compounds include 1-hydroxycyclohexyl phenyl ketones substituted by any substituent. Any substituent can be selected, provided that the compound can deliver its function as a radical polymerization initiator. Specific examples include alkyl groups having 1 to 4 carbon atoms.

Examples of α-amino ketone compounds that can be used include known compounds such as 2-methyl-1-phenyl-2-morpholinopropan-1-one, 2-methyl-1-[4-(hexyl)phenyl]-2-morpholinopropan-1-one, 2-ethyl-2-dimethylamino-1-(4-morpholinophenyl)butan-1-one, 2-benzyl-2-dimethylamino-1-(4-morpholinophenyl)-butan-1-one, and 2-dimethylamino-2-(4-methylbenzyl)-1-(4-morpholin-4-ylphenyl)-butan-1-one. Preferred examples of commercially available compounds include IRGACURE 907 (2-methyl-1-(4-methylthiophenyl)-2-morpholinopropan-1-one), IRGACURE 369 (2-benzyl-2-dimethyl amino-1-(4-morpholinophenyl)-1-butanone), and IRGACURE 379 (2-(dimethylamino)-2-[(4-methylphenyl)methyl]-1-[4-(4-morpholinyl)phenyl]-1-butanone) available from BASF.

The ink compositions that can be used in the present disclosure preferably contain at least a compound represented by formula (1) or (2) below. The use of a compound represented by formula (1) or (2) provides an ink jet ink composition with high curability and blocking resistance that allows little film component to leach out (migrate) and thus leaves less odor on printed matter.

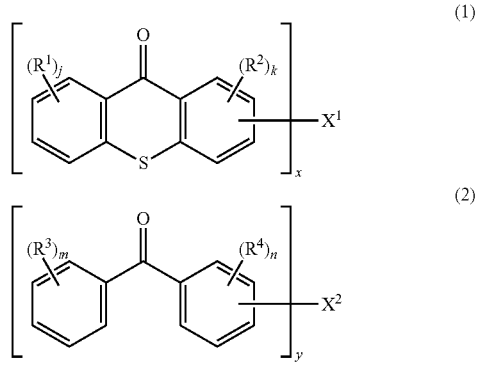

In formulae (1) and (2), $R^1$, $R^2$, $R^3$, and $R^4$ each independently represent an alkyl group having 1 to 5 carbon atoms or a halogen atom; x and y each independently represent an integer of 2 to 4; j and m each independently represent an integer of 0 to 4; k and n each independently represent an integer of 0 to 3; if j, k, m, or n represents an integer of 2 or more, the plurality of $R^1$'s $R^2$'s, $R^3$'s, or $R^4$'s may be the same or different; $X^1$ represents an x-functional linking group containing at least one of a hydrocarbon chain, an ether linkage, or an ester linkage; and $X^2$ represents a γ-functional linking group containing at least one of a hydrocarbon chain, an ether linkage, or an ester linkage.

The ink compositions preferably contain a compound represented by formula (1) as a polymerization initiator.

For preferred forms and specific examples of compounds represented by formula (1), reference may be made to those described in paragraphs 0035 to 0053 of JP2014-162828A.

As compounds represented by formula (1), commercially available compounds can also be used. Specific examples include SPEEDCURE 7010 (1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)]oxymethyl)propane, CAS No. 1003567-83-6) and OMNIPOL TX (polybutylene glycol bis(9-oxo-9H-thioxanthenyloxy)acetate, CAS No. 813452-37-8).

The ink compositions also preferably contain a compound represented by formula (2) as a polymerization initiator.

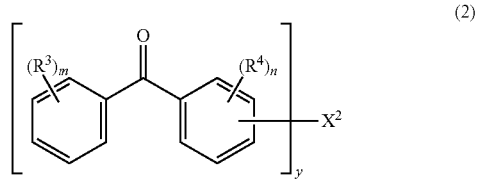

In formula (2), $R^3$ and $R^4$ each independently represent an alkyl group having 1 to 5 carbon atoms or a halogen atom; m represents an integer of 0 to 4; n represents an integer of 0 to 3; y represents an integer of 2 to 4; if m or n represents an integer of 2 or more, the plurality of $R^3$'s or $R^4$'s may be the same or different; and $X^2$ represents a γ-functional linking group having at least one of a hydrocarbon chain, an ether linkage, or an ester linkage.

The ink compositions preferably contain a compound represented by formula (2) as a polymerization initiator.

For preferred forms and specific examples of compounds represented by formula (2), reference may be made to those described in paragraphs 0054 to 0075 of JP2014-162828A.

As compounds represented by formula (2), commercially available compounds can also be used. Specific examples include OMNIPOL BP (polybutylene glycol bis(4-benzoylphenoxy)acetate, CAS No. 515136-48-8).

The compound represented by formula (1) or (2) is preferably present in an amount of 0.01% by mass to 10% by mass, more preferably 0.05% by mass to 8.0% by mass, even more preferably 0.1% by mass to 5.0% by mass, particularly preferably 0.1% by mass to 2.4% by mass, based on the total mass of the ink composition. This results in high curability.

The ink compositions preferably further contain, as a polymerization initiator, a compound that functions as a sensitizer (hereinafter also simply referred to as "sensitizer") to absorb particular active radiation and thereby promote the decomposition of the polymerization initiator.

Examples of sensitizers include polynuclear aromatic compounds (e.g., pyrene, perylene, triphenylene, and 2-ethyl-9,10-dimethoxyanthracene), xanthenes (e.g., fluorescein, eosin, erythrosine, Rhodamine B, and rose bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acriflavine), anthraquinones (e.g., anthraquinone), squaryliums (e.g., squarylium), coumarins (e.g., 7-diethylamino-4-methylcoumarin), thioxanthones (e.g., isopropylthioxanthone), and thiochromanones (e.g., thiochromanone).

In particular, thioxanthones are preferred as sensitizers, with isopropylthioxanthone being more preferred.

These sensitizers may be used alone or in a combination of two or more thereof.

The polymerization initiator is preferably present in a total amount of 1.0% by mass to 15.0% by mass, more preferably 1.5% by mass to 10.0% by mass, even more preferably 3.0% by mass to 8.0% by mass, based on the total mass of the ink composition. This results in high curability.

Colorant

The color ink composition and the white ink composition serving as the non-image-area-forming ink composition contain a colorant.

Preferred colorants include, but not limited to, pigments and oil-based dyes, which have high weather resistance and good color reproducibility. Any colorant can be selected and used from known colorants, including soluble dyes. To avoid a decrease in the sensitivity of the curing reaction with active radiation, it is preferred to select, as the colorant, a compound that does not function as a polymerization inhibitor.

The pigment may be any pigment selected as appropriate depending on the purpose, including known organic pigments and inorganic pigments. Other pigments include resin particles stained with dyes and commercially available pigment dispersions and surface-treated pigments (e.g., dispersions of pigments in dispersion media, such as resins, in which the pigments are insoluble and pigments having resins grafted to the surface thereof). Examples of such pigments include those described in S. Ito, ed. "Encyclopedia of Pigments" (2000), W. Herbst, K. Hunger "Industrial Organic Pigments", JP2002-12607A, JP2002-188025A, JP2003-26978A, and JP2003-342503A.

Examples of organic and inorganic pigments include yellow pigments, magenta pigments, blue or cyan pigments, green pigments, orange pigments, brown pigments, violet pigments, black pigments, and white pigments.

Yellow pigments are pigments that appear yellow. Examples of yellow pigments include monoazo pigments such as C.I. Pigment Yellow 1 (e.g., Fast Yellow G) and C.I. Pigment Yellow 74; disazo pigments such as C.I. Pigment Yellow 12 (e.g., disazo yellow), C.I. Pigment Yellow 17, C.I. Pigment Yellow 97, C.I. Pigment Yellow 3, C.I. Pigment Yellow 16, C.I. Pigment Yellow 83, C.I. Pigment Yellow 155, and C.I. Pigment Yellow 219; non-benzidine azo pigments such as C.I. Pigment Yellow 180; azo lake pigments such as C.I. Pigment Yellow 100 (e.g., tartrazine yellow lake); condensed azo pigments such as C.I. Pigment Yellow 95 (e.g., condensed azo yellow), C.I. Pigment Yellow 93, C.I. Pigment Yellow 94, C.I. Pigment Yellow 128, and C.I. Pigment Yellow 166; acid dye lake pigments such as C.I. Pigment Yellow 115 (e.g., quinoline yellow lake); basic dye lake pigments such as C.I. Pigment Yellow 18 (e.g., thioflavine lake); anthraquinone pigments such as C.I. Pigment Yellow 24 (e.g., flavanthrone yellow); quinophthalone pigments such as C.I. Pigment Yellow 110 (e.g., quinophthalone yellow); isoindoline pigments such as C.I. Pigment Yellow 139 (e.g., isoindoline yellow); pyrazolone pigments such as C.I. Pigment Yellow 60 (e.g., pyrazolone yellow); acetolone pigments such as C.I. Pigment Yellow 120, C.I. Pigment Yellow 154, C.I. Pigment Yellow 167, C.I. Pigment Yellow 151, C.I. Pigment Yellow 175, C.I. Pigment Yellow 180, C.I. Pigment Yellow 181, C.I. Pigment Yellow 185, and C.I. Pigment Yellow 194; metal complex salt pigments such as C.I. Pigment Yellow 150; nitroso pigments such as C.I. Pigment Yellow 153 (e.g., nickel nitroso yellow); and metal complex salt azomethine pigments such as C.I. Pigment Yellow 117 (e.g., copper azomethine yellow).

Magenta pigments are pigments that appear red or magenta. Examples of magenta pigments include monoazo pigments such as C.I. Pigment Red 3 (e.g., toluidine red); B-naphthol pigments such as C.I. Pigment Red 1, C.I. Pigment Red 4, and C.I. Pigment Red 6; disazo pigments such as C.I. Pigment Red 38 (e.g., Pyrazolone Red B); azo lake pigments such as C.I. Pigment Red 53:1 (e.g., Lake Red C), C.I. Pigment Red 57:1 (e.g., Brilliant Carmine 6B), C.I. Pigment Red 52:1, and C.I. Pigment Red 48 (e.g., B-oxynaphthoic acid lake); condensed azo pigments such as C.I. Pigment Red 144, C.I. Pigment Red 166, C.I. Pigment Red 220, C.I. Pigment Red 214, C.I. Pigment Red 221, and C.I. Pigment Red 242 (e.g., condensed azo red); acid dye lake pigments such as C.I. Pigment Red 174 (e.g., Phloxine B Lake) and C.I. Pigment Red 172 (e.g., erythrosine lake); basic dye lake pigments such as C.I. Pigment Red 81 (e.g., Rhodamine 6G' Lake); anthraquinone pigments such as C.I. Pigment Red 177 (e.g., dianthraquinonyl red); thioindigo pigments such as C.I. Pigment Red 88 (e.g., thioindigo bordeaux); perinone pigments such as C.I. Pigment Red 194 (e.g., perinone red); perylene pigments such as C.I. Pigment Red 149, C.I. Pigment Red 179, C.I. Pigment Red 178, C.I. Pigment Red 190, C.I. Pigment Red 224, and C.I. Pigment Red 123; quinacridone pigments such as C.I. Pigment Violet 19 (unsubstituted quinacridone), C.I. Pigment Red 122, C.I. Pigment Red 262, C.I. Pigment Red 207, and C.I. Pigment Red 209; isoindolinone pigments such as C.I. Pigment Red 180 (e.g., Isoindolinone Red 2BLT); alizarin lake pigments such as C.I. Pigment Red 83 (e.g., madder lake); naphtholone pigments such as C.I. Pigment Red 171, C.I. Pigment Red 175, C.I. Pigment Red 176, C.I. Pigment Red 185, and C.I. Pigment Red 208; Naphthol AS lake pigments such as C.I. Pigment Red 247; Naphthol AS pigments such as C.I. Pigment Red 2, C.I. Pigment Red 5, C.I. Pigment Red 21, C.I. Pigment Red 170, C.I. Pigment Red 187, C.I. Pigment Red 256, C.I. Pigment Red 268, and C.I. Pigment Red 269; and diketopyrrolopyrrole pigments such as C.I. Pigment Red 254, C.I. Pigment Red 255, C.I. Pigment Red 264, and C.I. Pigment Red 272.

Cyan pigments are pigments that appear blue or cyan. Examples of cyan pigments include disazo pigments such as C.I. Pigment Blue 25 (e.g., dianisidine blue); phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, and C.I. Pigment Blue 16 (e.g., phthalocyanine blue); acid dye lake pigments such as C.I. Pigment Blue 24 (e.g., peacock blue lake); basic dye lake pigments such as C.I. Pigment Blue 1 (e.g., Victoria Pure Blue BO lake); anthraquinone pigments such as C.I. Pigment Blue 60 (e.g., indanthrone blue); and alkali blue pigments such as C.I. Pigment Blue 18 (Alkali Blue V-5:1).

Green pigments are pigments that appear green. Examples of green pigments include phthalocyanine pigments such as C.I. Pigment Green 7 (phthalocyanine green) and C.I. Pigment Green 36 (phthalocyanine green); and azo metal complex pigments such as C.I. Pigment Green 8 and C.I. Pigment Green 10.

Orange pigments are pigments that appear orange. Examples of orange pigments include isoindoline pigments such as C.I. Pigment Orange 66 (isoindoline orange); anthraquinone pigments such as C.I. Pigment Orange 51 (dichloropyranthrone orange); B-naphthol pigments such as C.I. Pigment Orange 2, C.I. Pigment Orange 3, and C.I. Pigment Orange 5; Naphthol AS pigments such as C.I. Pigment Orange 4, C.I. Pigment Orange 22, C.I. Pigment Orange 24, C.I. Pigment Orange 38, and C.I. Pigment Orange 74; isoindolinone pigments such as C.I. Pigment Orange 61; perinone pigments such as C.I. Pigment Orange 43; disazo pigments such as C.I. Pigment Orange 15 and C.I. Pigment Orange 16; quinacridone pigments such as C.I. Pigment Orange 48 and C.I. Pigment Orange 49; acetolone pigments such as C.I. Pigment Orange 36, C.I. Pigment Orange 62, C.I. Pigment Orange 60, C.I. Pigment Orange 64, and C.I. Pigment Orange 72; and pyrazolone pigments such as C.I. Pigment Orange 13 and C.I. Pigment Orange 34.

Brown pigments are pigments that appear brown. Examples of brown pigments include naphtholone pigments such as C.I. Pigment Brown 25 and C.I. Pigment Brown 32.

Violet pigments are pigments that appear violet. Examples of violet pigments include naphtholone pigments such as C.I. Pigment Violet 32; perylene pigments such as C.I. Pigment Violet 29; Naphthol AS pigments such as C.I. Pigment Violet 13, C.I. Pigment Violet 17, and C.I. Pigment Violet 50; and dioxazine pigments such as C.I. Pigment Violet 23 and C.I. Pigment Violet 37.

Black pigments are pigments that appear black. Examples of black pigments include carbon black such as MOGUL E; titanium black; indazine pigments such as C.I. Pigment Black 1 (aniline black); and perylene pigments such as C.I. Pigment Black 31 and C.I. Pigment Black 32.

Examples of white pigments include basic lead carbonate (2 $PbCO_3Pb(OH)_2$, i.e., silver white), zinc oxide (ZnO, i.e., zinc white), titanium oxide ($TiO_2$, i.e., titanium white), and strontium titanate ($SrTiO_3$, i.e., titanium strontium white). Inorganic particles used as white pigments may be either simple particles or composite particles with, for example, oxides of metals such as silicon, aluminum, zirconium, and titanium, organometallic compounds, and organic compounds.

In particular, titanium oxide is suitable for use since it has a lower specific gravity than other white pigments, has high hiding and coloring power as a pigment because of its high refractive index and high chemical and physical stability, and has high resistance to acidic, alkaline, and other environments. Titanium oxide may be used in combination with other white pigments (including white pigments other than those listed above).

Examples of suitable dispersers that can be used to disperse the pigment include ball mills, sand mills, attritors, roller mills, jet mills, homogenizers, paint shakers, kneaders, agitators, Henschel mixers, colloid mills, ultrasonic homogenizers, pearl mills, and wet jet mills.

In the present disclosure, it is particularly preferred to add a dispersing agent described later when the pigment is dispersed.

In addition, a synergist serving as a dispersing aid may optionally be added depending on the type of pigment when the pigment is dispersed. The dispersing aid is preferably present in the ink compositions in an amount of 1 to 50 parts by mass based on 100 parts by mass of the pigment.

The dispersion medium used to disperse the pigment in the ink compositions may be any dispersion medium selected as appropriate depending on the purpose. For example, the low-molecular-weight polymerizable compounds listed above may be used as the dispersion medium. Alternatively, solvents may be used as the dispersion medium. However, the ink compositions according to the present disclosure, which are radiation-curable ink compositions and are, for example, applied to and cured on recording media, preferably contain no solvent, i.e., solvent-free. This is because any solvent remaining in the cured product would degrade the solvent resistance and would also cause the problem of volatile organic compounds (VOCs). Thus, the polymerizable compounds listed above are preferred for use as the dispersion medium. Of these, polymerizable compounds with the lowest viscosities are preferably selected to improve the suitability for dispersion and the handleability of the ink compositions.

Although the pigment may have any average particle size selected as appropriate depending on the purpose, finer pigments provide better color development properties. Preferably, the pigment has an average particle size of about 0.01 μmm to about 0.4 μm, more preferably 0.02 μmm to 0.2 μm. The pigment preferably has a maximum particle size of 3 μm or less, more preferably 1 μm or less. The particle size of the pigment can be adjusted, for example, by selecting the pigment, the dispersing agent, and the dispersion medium and setting the dispersion conditions and the filtration conditions. By controlling the particle size of the pigment, the clogging of head nozzles can be inhibited, and the preservation stability, transparency, and curing sensitivity of the inks can be maintained.

The particle size of the pigment can be measured by a known method of measurement. Specifically, the particle size can be measured by centrifugal sedimentation light transmission, X-ray transmission, laser diffraction scattering, or dynamic light scattering.

These colorants may be used alone or in a combination of two or more thereof.

The amount of colorant present in the ink compositions may be selected as appropriate depending on the color and the intended use. Preferably, the colorant is present in an amount of 0.01% by mass to 30% by mass based on the total mass of the ink composition.

The clear ink composition in the present disclosure contains substantially no colorant. Specifically, the clear ink composition in the present disclosure contains no colorant or contains a colorant in an amount of more than 0% by mass to 0.1% by mass based on the total mass of the clear ink composition, preferably contains no colorant or contains a colorant in an amount of more than 0% by mass to 0.05% by mass based on the total mass of the clear ink composition, particularly preferably contains no colorant.

Dispersing Agent

The ink compositions used in the present disclosure may contain a dispersing agent. In particular, if a pigment is used, the ink compositions used in the present disclosure preferably contain a dispersing agent so that the pigment can be stably dispersed therein. The dispersing agent is preferably a high-molecular-weight dispersant. In the present disclosure, "high-molecular-weight dispersant" refers to a dispersing agent having a weight average molecular weight of 1,000 or more.

Examples of high-molecular-weight dispersants include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (available from BYK Chemie); EFKA 4010, EFKA 4046, EFKA 4080, EFKA 5010, EFKA 5207, EFKA 5244, EFKA 6745, EFKA 6750, EFKA 7414, EFKA 745, EFKA 7462, EFKA 7500, EFKA 7570, EFKA 7575, EFKA 7580, and EFKA 7701 (available from EFKA additives); DISPERSE AID 6, DISPERSE AID 8, DISPERSE AID 15, and DISPERSE AID 9100 (available from San Nopco Limited); various SOLSPERSE dispersing agents such as SOLSPERSE 3000, 5000, 9000, 12000, 13240, 13940, 17000, 22000, 24000, 26000, 28000, 32000, 36000, 39000, 41000, and 71000 (available from Noveon); ADEKA PLURONIC L31, F38, L42, L44, L61, L64, F68, L72, P95, F77, P84, F87, P94, L101, P103, F108, L121, and P-123 (available from ADEKA Corporation); IONET S-20 (available from Sanyo Chemical Industries, Ltd.); DISPARLON KS-860, 873 SN, and 874 (high-molecular-weight dispersant); and #2150 (aliphatic polycarboxylic acid) and #7004 (polyether-ester type) (available from Kusumoto Chemicals, Ltd.).

The amount of dispersing agent present in the ink compositions may be selected as appropriate depending on the intended use. Preferably, the dispersing agent is present in an amount of 0.05% by mass to 15% by mass based on the total mass of the ink composition.

Surfactant

The ink compositions used in the present disclosure may contain a surfactant.

Surfactants that can be used include those described in JP1987-173463A (JP-S62-173463A) and JP1987-183457A (JP-S62-183457A). Examples of surfactants include anionic surfactants such as dialkyl sulfosuccinate salts, alkyl naphthalenesulfonate salts, and fatty acid salts; nonionic surfactants such as polyoxyethylene alkyl ethers, polyoxyethylene alkylaryl ethers, acetylene glycols, and polyoxyethylene-polyoxypropylene block copolymers; and cationic surfactants such as alkylamine salts and quaternary ammonium salts. The surfactant may also be a fluorine-containing surfactant (e.g., an organic fluoro compound) or a silicone surfactant (e.g., a polysiloxane compound). The organic fluoro compound is preferably hydrophobic. Examples of organic fluoro compounds include fluorine-containing surfactants, oily fluorine-containing compounds (e.g., fluorinated oil), and solid fluorine-containing compound resins (e.g., tetrafluoroethylene resin), such as those described in JP1982-9053B (JP-557-9053B) (columns 8 to 17) and JP1987-135826A (JP-562-135826A). The polysiloxane compound is preferably a modified polysiloxane compound in which organic groups are introduced to some of the methyl groups of the dimethylpolysiloxane. Examples of modifications include, but not limited to, polyether modifications, methylstyrene modifications, alcohol modifications, alkyl modifications, aralkyl modifications, fatty acid ester modifications, epoxy modifications, amine modifications, amino modifications, and mercapto modifications. These modifications may also be used in combination. In particular, polyether-modified polysiloxane compounds are preferred to improve the ink jet ejection stability. Examples of polyether-modified polysiloxane compounds include SILWET L-7604, SILWET L-7607N, SILWET FZ-2104, and SILWET FZ-2161 (available from NUC Corporation); BYK-306, BYK-307, BYK-331, BYK-333, BYK-347, and BYK-348 (available from BYK Chemie); and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (available from Shin-Etsu Chemical Co., Ltd.).

Of these, silicone surfactants are preferred.

The amount of surfactant present in the ink compositions used in the present disclosure may be selected as appropriate depending on the intended use. Preferably, the surfactant is present in an amount of 0.0001% by mass to 1% by mass based on the total mass of the ink composition.

Polymerization Inhibitor

To improve the storage stability and to inhibit head clogging, the ink compositions used in the present disclosure may contain a polymerization inhibitor.

Examples of polymerization inhibitors include nitroso polymerization inhibitors, hindered amine polymerization inhibitors, hindered phenol polymerization inhibitors, hydroquinone, benzoquinone, p-methoxyphenol, 2,2,6,6-tetramethylpiperidin-1-oxyl (TEMPO), 4-hydroxy-2,2,6,6-tetramethylpiperidin-1-oxyl (TEMPOL), and N-nitroso-N-phenylhydroxylamine aluminum salt (Cupferron Al).

These polymerization inhibitors may be used alone or in a combination of two or more thereof.

The polymerization inhibitor is preferably present in an amount of 0.001% by mass to 2% by mass, more preferably 0.01% by mass to 1% by mass, particularly preferably 0.02% by mass to 0.8% by mass, based on the total mass of the ink composition.

Solvent

The ink compositions used in the present disclosure may contain a solvent.

Examples of solvents include ketone solvents such as acetone, methyl ethyl ketone, and diethyl ketone; alcohol solvents such as methanol, ethanol, 2-propanol, 1-propanol, 1-butanol, and tert-butanol; chlorine-containing solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether, ethylene glycol dimethyl ether, and tripropylene glycol monomethyl ether; cyclic ester solvents such as γ-butyrolactone; and amide solvents such as 2-methylpyrrolidone and 2-pyrrolidone.

In this case, it is effective to add the solvent so as not to cause a problem with solvent resistance or VOCs. Preferably, the solvent is present in an amount of 0.1% by mass to 5% by mass, more preferably 0.1% by mass to 3% by mass, based on the total mass of the ink composition.

The solvent may be added to the ink compositions as the dispersion medium for the various components such as the pigment. Alternatively, the ink compositions may be solvent-free, and the polymerizable compound may be used as the dispersion medium. Preferably, the ink compositions are solvent-free.

Other Additives

The ink compositions used in the present disclosure may contain other additives, depending on the use.

Other additives that can be used include various known additives.

Examples of other additives that can be present include alkali-soluble resins, co-sensitizers, ultraviolet absorbers, basic compounds, leveling agents, matting agents, waxes, polymerization inhibitors, antioxidants, and tackifiers.

In view of ejectability from ink jet nozzles, the ink compositions used in the present disclosure preferably have a viscosity of 0.5 mPa·s to 30 mPa·s, more preferably 0.5 mPa·s to 20 mPa·s, most preferably 1 mPa·s to 15 mPa·s, at the temperature during ejection. The compositional ratio is preferably adjusted and determined as appropriate so that the viscosity falls within such a range.

The ink compositions preferably each have a viscosity of 1 mPa·s to 200 mPa·s, more preferably 2 mPa·s to 50 mPa·s, particularly preferably 5 mPa·s to 30 mPa·s, at 23° C. This results in a higher suitability for lamination and adhesion strength between a lamination film and an ink film.

The viscosity of the ink compositions in the present disclosure is measured with a TV-22 viscometer (available from Toki Sangyo Co., Ltd.) under the above temperature conditions.

The ink compositions used in the present disclosure preferably have a surface tension of 20 mN/m to 40 mN/m, more preferably 23 mN/m to 35 mN/m. When used for recording on various recording media such as polyolefin, PET, coated paper, and uncoated paper, the ink compositions used in the present disclosure preferably have a surface tension of 20 mN/m or more from the viewpoint of bleeding and penetration and preferably have a surface tension of 40 mN/m or less from the viewpoint of wettability.

The surface tension of the ink compositions in the present disclosure is measured with a CBVP-Z automatic surface tensiometer (available from Kyowa Interface Science, Inc.) at a liquid temperature of 25° C.

Laminated Printed Matter

Laminated printed matter according to the present disclosure has, in sequence, a recording medium, an image layer, and a lamination film. The image layer is composed of an image area and a non-image area. The non-image area is formed of a cured product selected from the group consisting of transparent cured products and white cured products. The non-image area adjoins a side of the image area in a direction along the plane of the recording medium.

The laminated printed matter according to the present disclosure contains few bubbles (high suitability for lamination).

The laminated printed matter according to the present disclosure is preferably manufactured by the method for manufacturing laminated printed matter according to the present disclosure.

The recording medium, the lamination film, and the image area of the laminated printed matter according to the present disclosure are synonymous with the recording medium, the lamination film, and the image area, respectively, in the method for manufacturing laminated printed matter according to the present disclosure described above, and preferred forms thereof are also similar.

The transparent cured products and the white cured products are synonymous with the cured product of the clear ink composition and the cured product of the white ink composition, respectively, used as the non-image-area-forming ink composition in the method for manufacturing laminated printed matter according to the present disclosure described above, and preferred forms thereof are also similar.

The image layer of the laminated printed matter according to the present disclosure is composed of an image area and a non-image area, and one entire surface of the lamination film is preferably in contact with the image layer (image and non-image areas).

The laminated printed matter according to the present disclosure and the laminated printed matter manufactured by the method for manufacturing laminated printed matter according to the present disclosure may be further processed into any shape or may be cut into any size as desired.

Examples

Embodiments of the present invention will now be described in detail with reference to the following examples, although these examples are not intended to limit the present disclosure. Parts and percentages are by mass unless otherwise specified.

The details of the individual components used in the Examples and the Comparative Examples are shown below.
Monomers
 SR344 (available from Sartomer, the following compound)
 IBOA (available from Sartomer, the following compound)
 SR341 (3-methyl-1,5-pentanediol diacrylate, available from Sartomer)
 NVC (N-vinylcaprolactam, available from BASF Japan Ltd.)
 TMPTA (trimethylolpropane triacrylate, available from Sartomer)
 SR444 (pentaerythritol triacrylate, available from Sartomer)

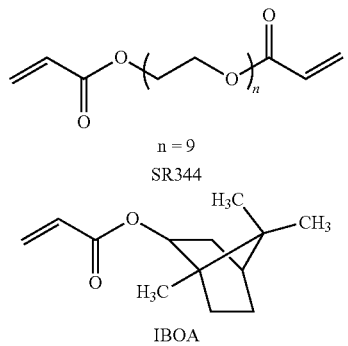

Silicone Surfactant
 BYK-307 (silicone surfactant (polyether-modified polydimethylsiloxane), available from BYK Chemie)
Polymerization Inhibitor
 UV-12 (FLORSTAB UV-12, nitroso polymerization inhibitor, tris(N-nitroso-N-phenylhydroxylamine) aluminum salt, available from Kromachem)
Photopolymerization Initiators
 Irg 819: IRGACURE 819 (bis(2,4,6-trimethylbenzoyl) phenylphosphine oxide, available from BASF)
 Speedcure 7010 (1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl] oxy}acetylpoly[oxy(1-methylethylene)]oxymethyl) propane, SPEEDCURE 7010 available from Lambson)
Colorants
 IRGALITE BLUE GLVO (cyan pigment, available from BASF Japan Ltd.)
 CINQUASIA MAGENTA RT-355-D (magenta pigment, available from BASF Japan Ltd.)
 NOVOPERM YELLOW H2G (yellow pigment, available from Clariant)
 SPECIAL BLACK 250 (black pigment, available from BASF Japan Ltd.)
 KRONOS 2300 (white pigment, available from KRONOS)
Dispersing Agents
 SOLSPERSE 32000 (dispersing agent available from Noveon)
 SOLSPERSE 41000 (dispersing agent available from Noveon)
Preparation of Mill Bases
Preparation of Cyan Mill Base
 A cyan mill base was prepared by mixing 300 parts by mass of IRGALITE BLUE GLVO, 620 parts by mass of SR341, and 80 parts by mass of SOLSPERSE 32000 with stirring. The pigment mill base was prepared by placing the ingredients into a Motor Mill M50 disperser (available from Eiger) and dispersing them with zirconia beads having a diameter of 0.65 mm at a rotation speed of 9 m/s for 4 hours.
Preparation of Magenta Mill Base
 M pigment (magenta pigment): CINQUASIA MAGENTA RT-355-D (available from BASF Japan Ltd.): 30 parts by mass
 SR341: 50 parts by mass
 SOLSPERSE 32000: 20 parts by mass
 A magenta mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.
Preparation of Yellow Mill Base
 Y pigment (yellow pigment): NOVOPERM YELLOW H2G (available from Clariant): 30 parts by mass
 SR341: 50 parts by mass
 SOLSPERSE 32000: 20 parts by mass
 A yellow mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of Black Mill Base

K pigment (black pigment): SPECIAL BLACK 250 (available from BASF Japan Ltd.): 30 parts by mass
SR341: 50 parts by mass
SOLSPERSE 32000: 20 parts by mass A black mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of White Mill Base

W pigment (white pigment): KRONOS 2300 (white pigment, available from KRONOS): 50 parts by mass
SR341: 45 parts by mass
SOLSPERSE 41000: 5 parts by mass A white mill base was prepared by mixing the above ingredients with stirring. The pigment mill base was prepared by placing the ingredients into a Motor Mill M50 disperser (available from Eiger) and dispersing them with zirconia beads having a diameter of 0.65 mm at a rotation speed of 9 m/s for 8 hours.

Preparation of Ink Compositions

Ink compositions (Ink Compositions 1 to 4) were prepared by mixing the mill bases and other additives according to the formulations shown in Tables 1 to 4 below with stirring.

As for the colors of the ink compositions, C denotes cyan, M denotes magenta, Y denotes yellow, K denotes black, W denotes white, and CL denotes clear (colorless and transparent).

TABLE 1

| | | Ink Composition No. 1 | | | | | |
|---|---|---|---|---|---|---|---|
| Color of ink composition | | C | M | Y | K | W | CL |
| Monomer | SR341 | — | — | — | — | — | — |
| | SR344 | — | — | — | — | — | — |
| | NVC | 20 | 20 | 20 | 20 | 20 | 20 |
| | IBOA | 64.1 | 57.6 | 63.1 | 67.6 | 43.6 | 73.6 |
| | TMPTA | — | — | — | — | — | — |
| | SR444 | — | — | — | — | — | — |
| Polymerization initiator | Irg 819 | 4 | 4 | 4 | 4 | 4 | 4 |
| | Speedcure 7010 | 2 | 2 | 2 | 2 | 2 | 2 |
| Mill base | Cyan mill base | 9.5 | — | — | — | — | — |
| | Magenta mill base | — | 16 | — | — | — | — |
| | Yellow mill base | — | — | 10.5 | — | — | — |
| | Black mill base | — | — | — | 6 | — | — |
| | White mill base | — | — | — | — | 30 | — |
| Polymerization inhibitor | UV-12 | 0.3 | 0.3 | 0.3 | 0.3 | 0.3 | 0.3 |
| Surfactant | BYK-307 | 0.1 | 0.1 | 0.1 | 0.1 | 0.1 | 0.1 |
| Total | | 100 | 100 | 100 | 100 | 100 | 100 |
| Volume shrinkage (%) | | 6 | 6 | 6 | 6 | 6 | 6 |

TABLE 2

| | | Ink Composition No. 2 | | | | | |
|---|---|---|---|---|---|---|---|
| Color of ink composition | | C | M | Y | K | W | CL |
| Monomer | SR341 | 20 | 20 | 20 | 20 | 20 | 20 |
| | SR344 | — | — | — | — | — | — |
| | NVC | 20 | 20 | 20 | 20 | 20 | 20 |
| | IBOA | 44.1 | 37.6 | 43.1 | 47.6 | 23.6 | 53.6 |
| | TMPTA | — | — | — | — | — | — |
| | SR444 | — | — | — | — | — | — |
| Polymerization initiator | Irg 819 | 4 | 4 | 4 | 4 | 4 | 4 |
| | Speedcure 7010 | 2 | 2 | 2 | 2 | 2 | 2 |
| Mill base | Cyan mill base | 9.5 | — | — | — | — | — |
| | Magenta mill base | — | 16 | — | — | — | — |
| | Yellow mill base | — | — | 10.5 | — | — | — |
| | Black mill base | — | — | — | 6 | — | — |
| | White mill base | — | — | — | — | 30 | — |
| Polymerization inhibitor | UV-12 | 0.3 | 0.3 | 0.3 | 0.3 | 0.3 | 0.3 |
| Surfactant | BYK-307 | 0.1 | 0.1 | 0.1 | 0.1 | 0.1 | 0.1 |
| Total | | 100 | 100 | 100 | 100 | 100 | 100 |
| Volume shrinkage (%) | | 12 | 12 | 12 | 12 | 12 | 12 |

TABLE 3

| | | Ink Composition No. 3 | | | | | |
|---|---|---|---|---|---|---|---|
| Color of ink composition | | C | M | Y | K | W | CL |
| Monomer | SR341 | 64.1 | 57.6 | 63.1 | 67.6 | 43.6 | 73.6 |
| | SR344 | 20 | 20 | 20 | 20 | 20 | 20 |
| | NVC | — | — | — | — | — | — |
| | IBOA | — | — | — | — | — | — |
| | TMPTA | — | — | — | — | — | — |
| | SR444 | — | — | — | — | — | — |
| Polymerization initiator | Irg 819 | 4 | 4 | 4 | 4 | 4 | 4 |
| | Speedcure 7010 | 2 | 2 | 2 | 2 | 2 | 2 |
| Mill base | Cyan mill base | 9.5 | — | — | — | — | — |
| | Magenta mill base | — | 16 | — | — | — | — |
| | Yellow mill base | — | — | 10.5 | — | — | — |
| | Black mill base | — | — | — | 6 | — | — |
| | White mill base | — | — | — | — | 30 | — |
| Polymerization inhibitor | UV-12 | 0.3 | 0.3 | 0.3 | 0.3 | 0.3 | 0.3 |
| Surfactant | BYK-307 | 0.1 | 0.1 | 0.1 | 0.1 | 0.1 | 0.1 |
| Total | | 100 | 100 | 100 | 100 | 100 | 100 |
| Volume shrinkage (%) | | 18 | 18 | 18 | 18 | 18 | 18 |

TABLE 4

| | | Ink Composition No. 4 | | | | | |
|---|---|---|---|---|---|---|---|
| Color of ink composition | | C | M | Y | K | W | CL |
| Monomer | SR341 | 64.1 | 57.6 | 63.1 | 67.6 | 43.6 | 73.6 |
| | SR344 | — | — | — | — | — | — |
| | NVC | — | — | — | — | — | — |
| | IBOA | — | — | — | — | — | — |
| | TMPTA | 10 | 10 | 10 | 10 | 10 | 10 |
| | SR444 | 10 | 10 | 10 | 10 | 10 | 10 |
| Polymerization initiator | Irg 819 | 4 | 4 | 4 | 4 | 4 | 4 |
| | Speedcure 7010 | 2 | 2 | 2 | 2 | 2 | 2 |
| Mill base | Cyan mill base | 9.5 | — | — | — | — | — |
| | Magenta mill base | — | 16 | — | — | — | — |
| | Yellow mill base | — | — | 10.5 | — | — | — |
| | Black mill base | — | — | — | 6 | — | — |
| | White mill base | — | — | — | — | 30 | — |
| Polymerization inhibitor | UV-12 | 0.3 | 0.3 | 0.3 | 0.3 | 0.3 | 0.3 |
| Surfactant | BYK-307 | 0.1 | 0.1 | 0.1 | 0.1 | 0.1 | 0.1 |
| Total | | 100 | 100 | 100 | 100 | 100 | 100 |
| Volume shrinkage (%) | | 25 | 25 | 25 | 25 | 25 | 25 |

The volume shrinkage (%) of the ink compositions was determined using a CUSTRON EU201C (available from AcroEdge Corporation). Each ink composition was injected into a polytetrafluoroethylene ring for the above device. The ring was set such that a load cell (stress-measuring means) contacted the surface of the injected ink composition. The ink composition was exposed to ultraviolet (UV) light at 100 mW/cm$^2$ in air at 1 atmosphere for 1 second. The amount of shrinkage of the cured product was measured and used to calculate the volume shrinkage (%) of the ink composition.

Printing Method

In a roller transport system, black ink jet heads, an LED light source, cyan ink jet heads, an LED light source, magenta ink jet heads, an LED light source, white ink jet heads, an LED light source, clear ink jet heads, and a nitrogen (N$_2$)-purged LED exposure device were arranged in the above order.

As the ink jet heads, four CA3 heads available from Toshiba Tec Corporation were arranged in juxtaposition for each color. The heads were warmed to 45° C., and the frequency was controlled to form images at a droplet size of 42 pL. As the LED light sources, LED light source units with a peak wavelength of 385 nm (LEDZero Solidcure, available from Integration Technology) were used. Nitrogen purging was performed using, as an inert gas source, a Maxi-Flow 30 N$_2$ gas generator with a compressor (available from Inhouse Gas) connected at a pressure of 0.2 MPa·s. By allowing nitrogen to flow at a flow rate of 2 L/min to 10 L/min, the nitrogen concentration was set so that the oxygen partial pressure in the blanket was as shown in Tables 5 to 7. As the recording media, PET films (the trade name FE2001, available from Futamura Chemical Co., Ltd., thickness: 12 μm, width: 540 mm, length: 4,000 m) were used. The yellow, magenta, cyan, black, and white ink compositions shown in Tables 5 to 7 were ejected while the heads were scanned at a speed of 50 m/min. The ink compositions were then semi-cured with the LED light sources (at an exposure level of 10 W/cm$^2$ for semi-curing) to form solid images (form image areas) such that the thickness after curing was x μm in Tables 5 to 7.

The solid images in the image areas were formed of 20% by volume of the yellow (Y) ink, 20% by volume of the magenta (M) ink, 20% by volume of the cyan (C) ink, 20% by volume of the black (K) ink, and 20% by volume of the white (W) ink.

Next, the clear ink compositions shown in Tables 5 to 7 were ejected from the clear ink jet heads into the non-image areas to form clear ink films over the entire non-image areas such that the thickness after curing was y μm in Tables 5 to 7.

Figure 3:
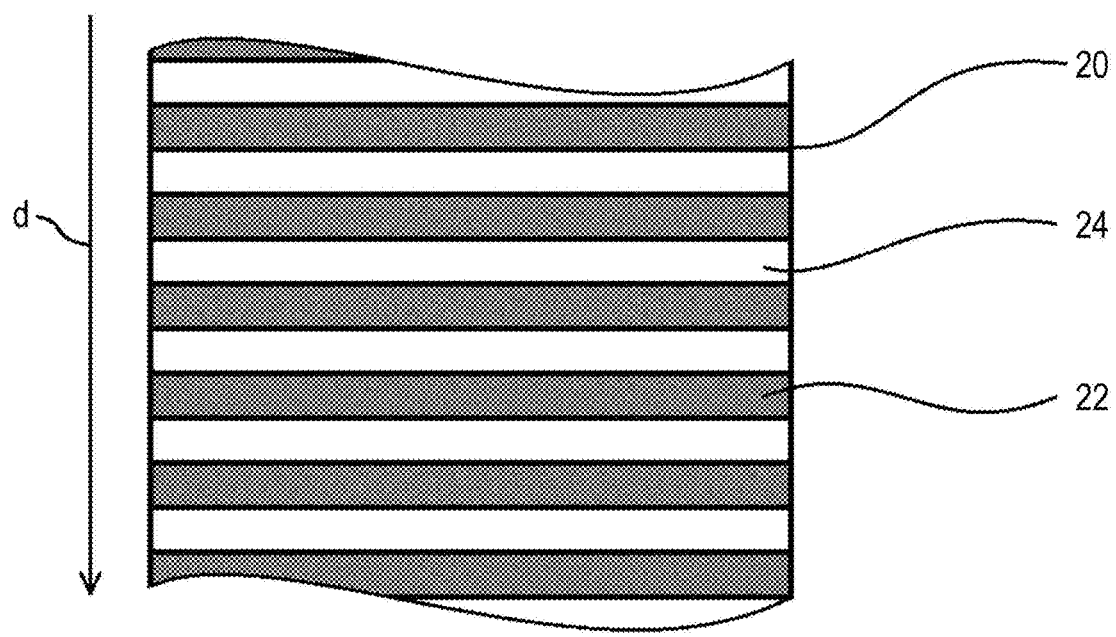
FIG. 3 is a simplified schematic view of still another example of image and non-image areas in the method for manufacturing laminated printed matter according to the present disclosure.

As the image and non-image areas, a striped image shown in FIG. 3 was formed. The widths of image areas 22 and non-image areas 24 in a transport direction d were each 3 cm. The lateral width of a recording medium 20 (the length in the direction orthogonal to the transport direction) was 54 cm.

The images were then completely cured with the nitrogen-purged LED exposure device (at an exposure level of 100 mJ/cm$^2$) to obtain printed matter.

The resulting printed matter was subjected to the various performance tests shown below.

Evaluation Methods
Color Density

An eXact Scan available from X-Rite was used to measure the color density of the solid images in the image areas. The rating scale is shown below:

5: The color density was 1.5 or more.
4: The color density was 1.2 to less than 1.5.
3: The color density was 1.0 to less than 1.2.
2: The color density was 0.8 to less than 1.0.
1: The color density was less than 0.8.

Ratings of 3 or higher are acceptable for practical use.

Reactivity

Ink films with an area of 10 cm$^2$ were cut from the image and non-image areas of 4,000 m long printed matter produced by the printing method described above. The amount of residual monomer extracted from each ink film after immersion in tetrahydrofuran (THF) for one day was measured to assess the reactivity. The rating scale is shown below:

5: The total amount of residual monomer extracted from the ink films in the image and non-image areas was less than 10 ppm.
4: The total amount of residual monomer extracted from the ink films in the image and non-image areas was 10 ppm to less than 12.5 ppm.
3: The total amount of residual monomer extracted from the ink films in the image and non-image areas was 12.5 ppm to less than 15 ppm.
2: The total amount of residual monomer extracted from the ink films in the image and non-image areas was 15 ppm to less than 17.5 ppm.
1: The total amount of residual monomer extracted from the ink films in the image and non-image areas was 17.5 ppm or more.

Ratings of 3 or higher are acceptable for practical use.

Suitability for Lamination

A lamination adhesive (the trade names KO-55 and LX-500 (used as a mixture at KO-55:LX-500=1:9, both available from DIC Corporation)) was applied at a thickness of 2 to 4,000 m long printed matter produced by the printing method described above. The lamination films shown below were then laminated with an SDL-1300 dry laminator available from Sobu Machinery Co., Ltd. at a speed of 100 m/min, followed by a drying process at 70° C. for 1 minute to obtain laminated printed matter.

TUX-MCS 40 μm (linear low-density polyethylene (LL-DPE) film, thickness: 40 μm, available from Mitsui Chemicals Tohcello Inc.)

TUX-MCS 25 μm (linear low-density polyethylene film, thickness: 25 μm, available from Mitsui Chemicals Tohcello Inc.)

TUX-MCS 100 μm (linear low-density polyethylene film, thickness: 100 μm, available from Mitsui Chemicals Tohcello Inc.)

GHC 25 μm (cast polypropylene (CP) film, thickness: 25 μm, available from Mitsui Chemicals Tohcello Inc.)

GHC 40 μm (cast polypropylene film, thickness: 40 μm, available from Mitsui Chemicals Tohcello Inc.)

GHC 60 μm (cast polypropylene film, thickness: 60 μm, available from Mitsui Chemicals Tohcello Inc.)

The rating scale for suitability for lamination is shown below:

5: Lamination was accomplished without any bubble trapped over the 4,000 m long printed matter.
4: Lamination was accomplished without any bubble trapped over a length of 3,500 m to less than 4,000 m.
3: Lamination was accomplished without any bubble trapped over a length of 3,000 m to less than 3,500 m.
2: Lamination was accomplished without any bubble trapped over a length of 2,500 m to less than 3,000 m.
1: Bubbles were trapped within a length of less than 2,500 m.

Ratings of 3 or higher are acceptable for practical use.

Adhesion Strength (Adhesion between Lamination Film and Ink Film)

A 1 cm wide cellophane tape was applied to the laminated surface of the laminated printed matter. The peeling force between the lamination film and the ink film (the force required for peeling in N/cm, peeling speed: 300 mm/min) was measured with a ZTS series standard-type digital force gauge, an MX2 series vertical motorized test stand, a P90-200N/200N-EZ 90° peel test fixture, and an FC series film chuck available from Imada Co., Ltd. The rating scale is shown below, where a larger peeling force indicates a better adhesiveness:

5: 0.5 N/cm or more
4: 0.25 N/cm to less than 0.5 N/cm
3: 0.1 N/cm to less than 0.25 N/cm
2: 0.05 N/cm to less than 0.1 N/cm
1: less than 0.05 N/cm Ratings of 3 or higher are acceptable for practical use.

The evaluation results for the Examples and the Comparative Examples are summarized in Tables 5 to 7 shown below.

TABLE 5

|  | Example 1 | Example 2 | Example 3 | Example 4 | Example 5 | Example 6 |
|---|---|---|---|---|---|---|
| Ink Composition No. | 3 | 3 | 3 | 3 | 3 | 3 |
| Ink film thickness in image area (x μm) | 25 | 20 | 12 | 6 | 20 | 20 |
| Ink film thickness in non-image area (y μm) | 6 | 6 | 6 | 6 | 6 | 6 |
| $|x - y|$ (μm) | 19 | 14 | 6 | 0 | 14 | 14 |
| Oxygen partial pressure (atm) | 0.15 | 0.15 | 0.15 | 0.15 | 0.1 | 0.05 |
| Color density | 5 | 5 | 4 | 3 | 5 | 5 |
| Reactivity | 4 | 4 | 5 | 5 | 5 | 5 |
| Suitability for lamination (with various lamination films) | 4 | 4 | 5 | 5 | 4 | 5 |
| Adhesion strength between lamination film and ink film | 3 | 4 | 4 | 5 | 4 | 5 |

TABLE 6

|  | Example 7 | Example 8 | Example 9 | Example 10 | Example 11 | Example 12 | Example 13 | Example 14 |
|---|---|---|---|---|---|---|---|---|
| Ink Composition No. | 3 | 3 | 3 | 3 | 3 | 3 | 3 | 3 |
| Ink film thickness in image area (x μm) | 20 | 20 | 20 | 6 | 25 | 14.5 | 25 | 20 |
| Ink film thickness in non-image area (y μm) | 0.5 | 3 | 12 | 12 | 3 | 0.5 | 11 | 6 |
| $|x - y|$ (μm) | 19.5 | 17 | 8 | 6 | 22 | 14.0 | 14 | 14 |
| Oxygen partial pressure (atm) | 0.15 | 0.15 | 0.15 | 0.15 | 0.15 | 0.15 | 0.15 | 0.2 |
| Color density | 5 | 5 | 5 | 3 | 5 | 4 | 5 | 5 |
| Reactivity | 3 | 4 | 5 | 5 | 4 | 4 | 5 | 3 |
| Suitability for lamination (with various lamination films) | 3 | 4 | 5 | 5 | 3 | 4 | 5 | 3 |
| Adhesion strength between lamination film and ink film | 3 | 3 | 4 | 4 | 3 | 3 | 4 | 3 |

TABLE 7

| No. | Example 15 | Example 16 | Example 17 | Comparative Example 1 | Comparative Example 2 |
|---|---|---|---|---|---|
| Ink Composition No. | 1 | 2 | 4 | 3 | 3 |
| Ink film thickness in image area (x μm) | 20 | 20 | 20 | 6 | 19 |
| Ink film thickness in non-image area (y μm) | 3 | 3 | 3 | 0 | 0 |
| $|x - y|$ (μm) | 17 | 17 | 17 | 6 | 19 |
| Oxygen partial pressure (atm) | 0.15 | 0.15 | 0.15 | 0.1 | 0.1 |
| Color density | 5 | 5 | 5 | 3 | 5 |
| Reactivity | 4 | 4 | 5 | 3 | 1 |
| Suitability for lamination (with various lamination films) | 3 | 4 | 5 | 1 | 2 |
| Adhesion strength between lamination film and ink film | 3 | 3 | 4 | 1 | 1 |

In each of the Examples and the Comparative Examples, the evaluation results of suitability for lamination shown in Tables 5 to 7 were identical no matter which of the TUX-MCS 40 µm, TUX-MCS 25 TUX-MCS 100 µm, GHC 25 GHC 40 µm, and GHC 60 µm lamination films was laminated.

As can be seen from the results in Tables 5 to 7, the method for manufacturing laminated printed matter according to the present disclosure provides high suitability for lamination.

The results for Examples 1 to 4, 10, and 11 show that a larger value of x results in a higher color density and that a smaller value of |x−y| results in a higher reactivity, suitability for lamination, and adhesion strength between a lamination film and an ink film.

The results for Examples 1, 5, 6, and 14 show that a lower oxygen partial pressure results in a higher reactivity and, even if the value of |x−y| exceeds 10 µm, results in a higher suitability for lamination and adhesion strength between a lamination film and an ink film.

The results for Examples 1 and 7 to 9 show that a larger thickness of a cured film of a clear ink composition in a non-image area results in a higher reactivity, suitability for lamination, and adhesion strength between a lamination film and an ink film.

The results for Examples 2, 12, and 13 show that a larger thickness of a cured film of a color ink composition (ink film thickness) results in a higher color density, reactivity, suitability for lamination, and adhesion strength between a lamination film and an ink film.

The results for Examples 1 and 15 to 17 show that a larger amount of di- or higher-functional polymerizable compound present in an ink composition results in a higher color density, reactivity, suitability for lamination, and adhesion strength between a lamination film and an ink film.

Image areas having the thicknesses shown in Tables 5 to 7 were formed from the yellow, magenta, cyan, and black ink compositions shown in Tables 5 to 7. Non-image areas having the thicknesses shown in Tables 5 to 7 were formed from the white ink compositions shown in Tables 5 to 7. These image and non-image areas were evaluated under the same conditions as above. It was found that the same evaluation results as in Example 1 to 17 were obtained.

The solid images in the non-image areas in this case were formed of 25% by volume of the yellow (Y) ink, 25% by volume of the magenta (M) ink, 25% by volume of the cyan (C) ink, and 25% by volume of the black (K) ink.

The entire disclosure of JP2017-015858 filed Jan. 31, 2017 is incorporated herein by reference.

All documents, patent applications, and technical standards recited herein are incorporated herein by reference to the same extent as when it is specifically and individually stated that the individual documents, patent applications, and technical standards are incorporated by reference.

REFERENCE SIGNS LIST

12: recording medium, 14: image area, 14A: cured ink film of color ink composition in image area, 14B: cured ink film of clear ink composition or white ink composition in image area, 16: non-image area, 20: recording medium, 22: image area, 24: non-image area, d: transport direction of recording medium, x: ink film thickness in image area, y: ink film thickness in non-image area

What is claimed is:

1. A method for manufacturing laminated printed matter, comprising:
    ejecting, by an ink jet process, a colorant-containing active-radiation-curable ink composition onto a recording medium;
    ejecting, by an ink jet process, a colorant-free or white-pigment-containing active-radiation-curable ink composition into a non-image area adjoining an image area formed by the colorant-containing active-radiation-curable ink composition;
    curing the ejected colorant-containing active-radiation-curable ink composition and the ejected colorant-free or white-pigment-containing active-radiation-curable ink composition by irradiation with active radiation to form an image layer; and
    laminating a lamination film on a surface on which the image layer has been formed,
    wherein a thickness of the image layer in the non-image area is from 3 µm to 20 µm, and a thickness of the image layer in the image area is greater than the thickness of the image layer in the non-image area by from 2 µm to 15 µm,
    wherein the colorant-containing active-radiation-curable ink composition and the colorant-free or white-pigment-containing active-radiation-curable ink composition are cured in an atmosphere with an oxygen partial pressure of 0.15 atm or less, and
    wherein the colorant-containing active-radiation-curable ink composition and the colorant-free or white-pigment-containing active-radiation-curable ink composition each contain a di- or higher-functional polymerizable compound in an amount of 50% by mass or more based on a total mass of the ink composition.

2. The method for manufacturing laminated printed matter according to claim 1, wherein an ink film thickness x in the image area is 6 µm to 35 µm.

3. The method for manufacturing laminated printed matter according to claim 1, wherein an ink film thickness y in a portion, where the colorant-free or white-pigment-containing active-radiation-curable ink composition has been ejected, of the non-image area is from 4 µm to 15 µm.

4. The method for manufacturing laminated printed matter according to claim 1, wherein the recording medium is a resin film containing at least one component selected from the group consisting of polyethylene terephthalate, polyethylene, polypropylene, and nylon.

5. The method for manufacturing laminated printed matter according to claim 1, wherein the recording medium has a thickness of 10 µm to 100 µm.

6. The method for manufacturing laminated printed matter according to claim 1, wherein the colorant-containing active-radiation-curable ink composition and the colorant-free or white-pigment-containing active-radiation-curable ink composition each have a viscosity of 5 mPa·s to 30 mPa·s at 23° C.

7. The method for manufacturing laminated printed matter according to claim 1, wherein a light source of the active radiation is a light-emitting diode.

8. The method for manufacturing laminated printed matter according to claim 1, wherein the thickness of the image layer in the image area is greater than the thickness of the image layer in the non-image area by from 5 µm to 14 µm.

* * * * *